(12) United States Patent
Minegishi

(10) Patent No.: US 10,873,676 B2
(45) Date of Patent: Dec. 22, 2020

(54) INFORMATION PROCESSING APPARATUS, INSTALLATION METHOD, AND RECORDING MEDIUM

(71) Applicant: Youichi Minegishi, Kanagawa (JP)

(72) Inventor: Youichi Minegishi, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 97 days.

(21) Appl. No.: 15/876,516

(22) Filed: Jan. 22, 2018

(65) Prior Publication Data

US 2018/0227445 A1 Aug. 9, 2018

(30) Foreign Application Priority Data

Feb. 7, 2017 (JP) ................. 2017-020495

(51) Int. Cl.
*H04N 1/00* (2006.01)
*G06F 3/12* (2006.01)

(52) U.S. Cl.
CPC ....... *H04N 1/00416* (2013.01); *G06F 3/1204* (2013.01); *G06F 3/1205* (2013.01); *G06F 3/1225* (2013.01); *G06F 3/1231* (2013.01); *G06F 3/1232* (2013.01); *G06F 3/1284* (2013.01); *G06F 3/1285* (2013.01); *G06F 3/1228* (2013.01); *H04N 2201/0094* (2013.01)

(58) Field of Classification Search
CPC ............. H04L 41/5025; H04L 41/0813; G06F 3/1205; G06F 3/1284
USPC ........................................................ 709/221
See application file for complete search history.

(56) References Cited

U.S. PATENT DOCUMENTS

| 7,047,528 | B2 | 5/2006 | Iida | |
|---|---|---|---|---|
| 7,316,022 | B2 | 1/2008 | Nishio | |
| 8,726,370 | B2 | 5/2014 | Minegishi | |
| 8,881,128 | B2 * | 11/2014 | Ierullo | G06Q 10/06 717/168 |
| 8,954,951 | B1 * | 2/2015 | Cohen | G06F 8/65 717/168 |

(Continued)

FOREIGN PATENT DOCUMENTS

| JP | 2003-084984 | 3/2003 |
|---|---|---|
| JP | 4464029 | 5/2010 |
| JP | 2011-242994 | 12/2011 |

*Primary Examiner* — Mahran Y Abu Roumi
(74) *Attorney, Agent, or Firm* — IPUSA, PLLC

(57) ABSTRACT

In an information processing apparatus, a program corresponding to an electronic device is installed in response to the electronic device being connected to the information processing apparatus. The information processing apparatus includes a processor, in communication with a memory, executing a process including collecting information relating to a first program already installed in the information processing apparatus; acquiring identification information of the electronic device from the electronic device connected to the information processing apparatus; and determining whether to install a second program identified by the identification information, by using the information relating to the first program identified from the identification information. The second program is of a different version than a version of the first program, and the second program is included in a storage medium or a device connected to the information processing apparatus.

18 Claims, 26 Drawing Sheets

(56) References Cited

U.S. PATENT DOCUMENTS

| | | | |
|---|---|---|---|
| 2004/0255290 A1* | 12/2004 | Bates | G06F 11/0748 |
| | | | 717/174 |
| 2006/0070063 A1* | 3/2006 | Takashige | G06F 8/60 |
| | | | 717/174 |
| 2009/0217161 A1 | 8/2009 | Minegishi | |
| 2014/0007077 A1* | 1/2014 | Yasui | G06F 8/61 |
| | | | 717/174 |
| 2015/0244743 A1* | 8/2015 | Jagad | G06F 21/577 |
| | | | 726/1 |
| 2015/0248263 A1* | 9/2015 | Hattori | G06F 3/1204 |
| | | | 358/1.15 |
| 2015/0363185 A1* | 12/2015 | Garratt | G06F 8/65 |
| | | | 717/168 |
| 2016/0274825 A1 | 9/2016 | Minegishi | |
| 2016/0274846 A1 | 9/2016 | Minegishi | |
| 2016/0274851 A1 | 9/2016 | Minegishi | |
| 2017/0153884 A1 | 6/2017 | Minegishi | |
| 2017/0212744 A1* | 7/2017 | Okamoto | G06F 8/62 |
| 2017/0279998 A1* | 9/2017 | Nakagawa | H04N 1/00938 |
| 2018/0060119 A1* | 3/2018 | Zamir | G06F 9/4856 |
| 2018/0067734 A1* | 3/2018 | Prasad | G06F 11/3438 |
| 2018/0232138 A1* | 8/2018 | Kanematsu | G06F 8/65 |
| 2019/0095385 A1* | 3/2019 | Yu | G06F 16/162 |

* cited by examiner

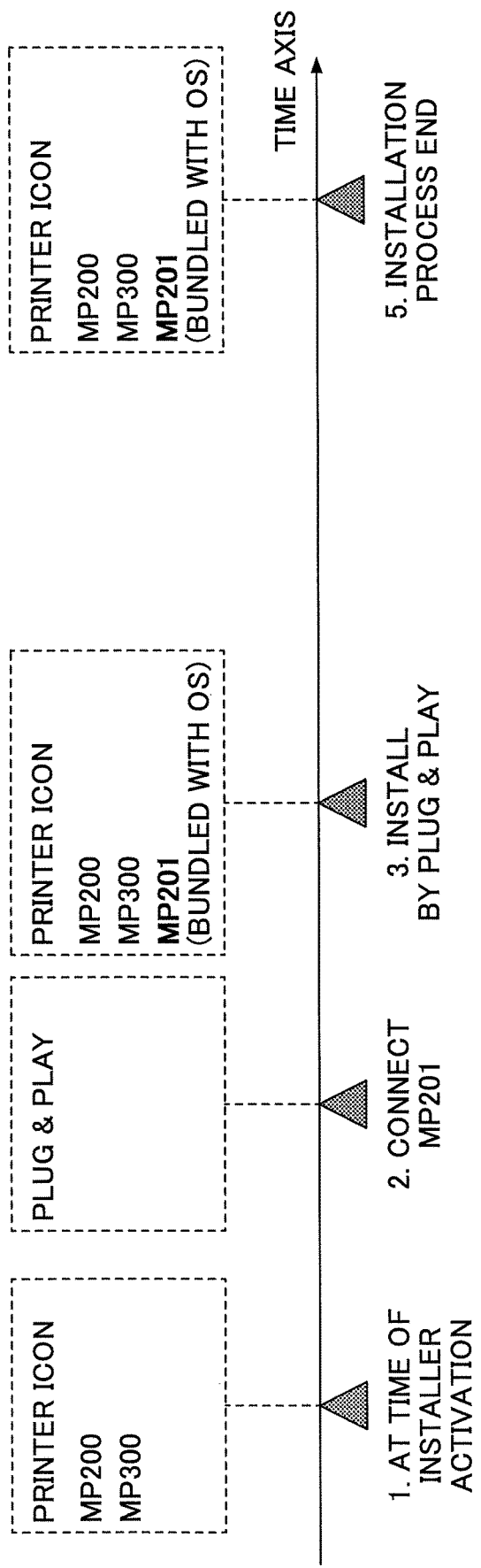

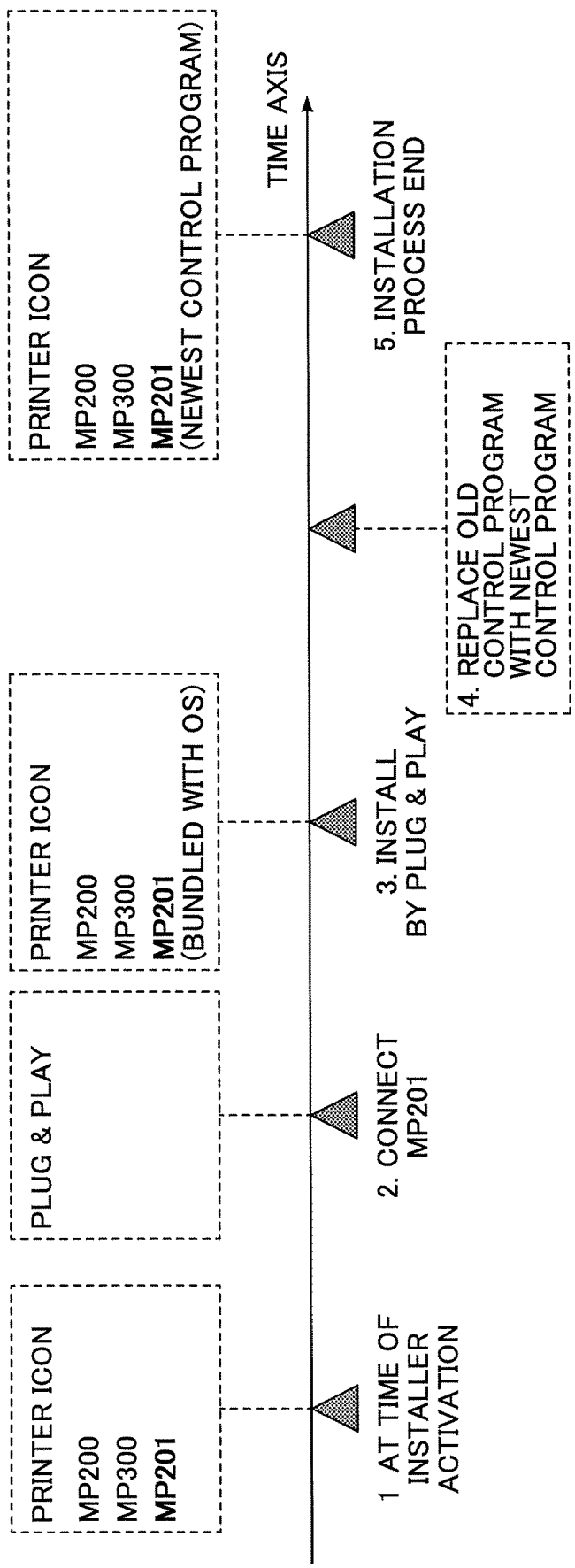

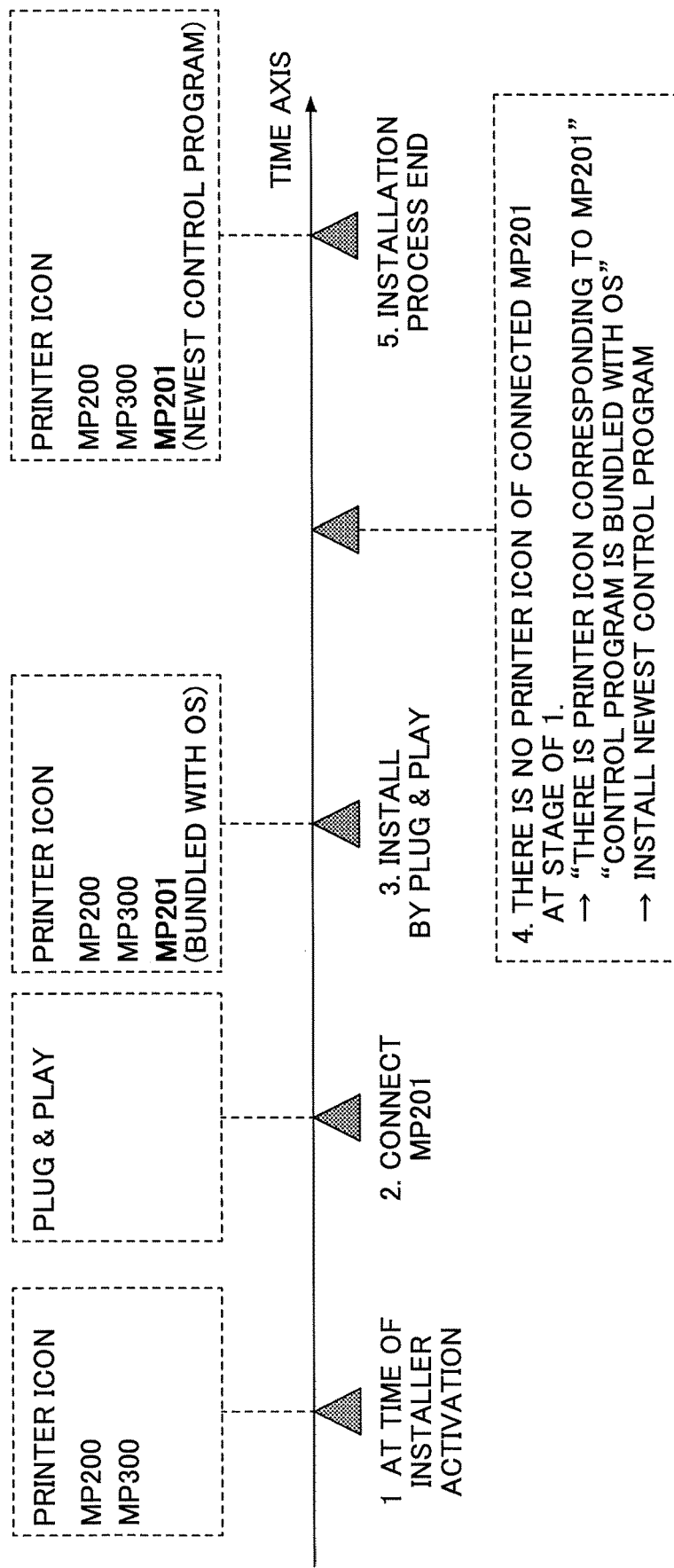

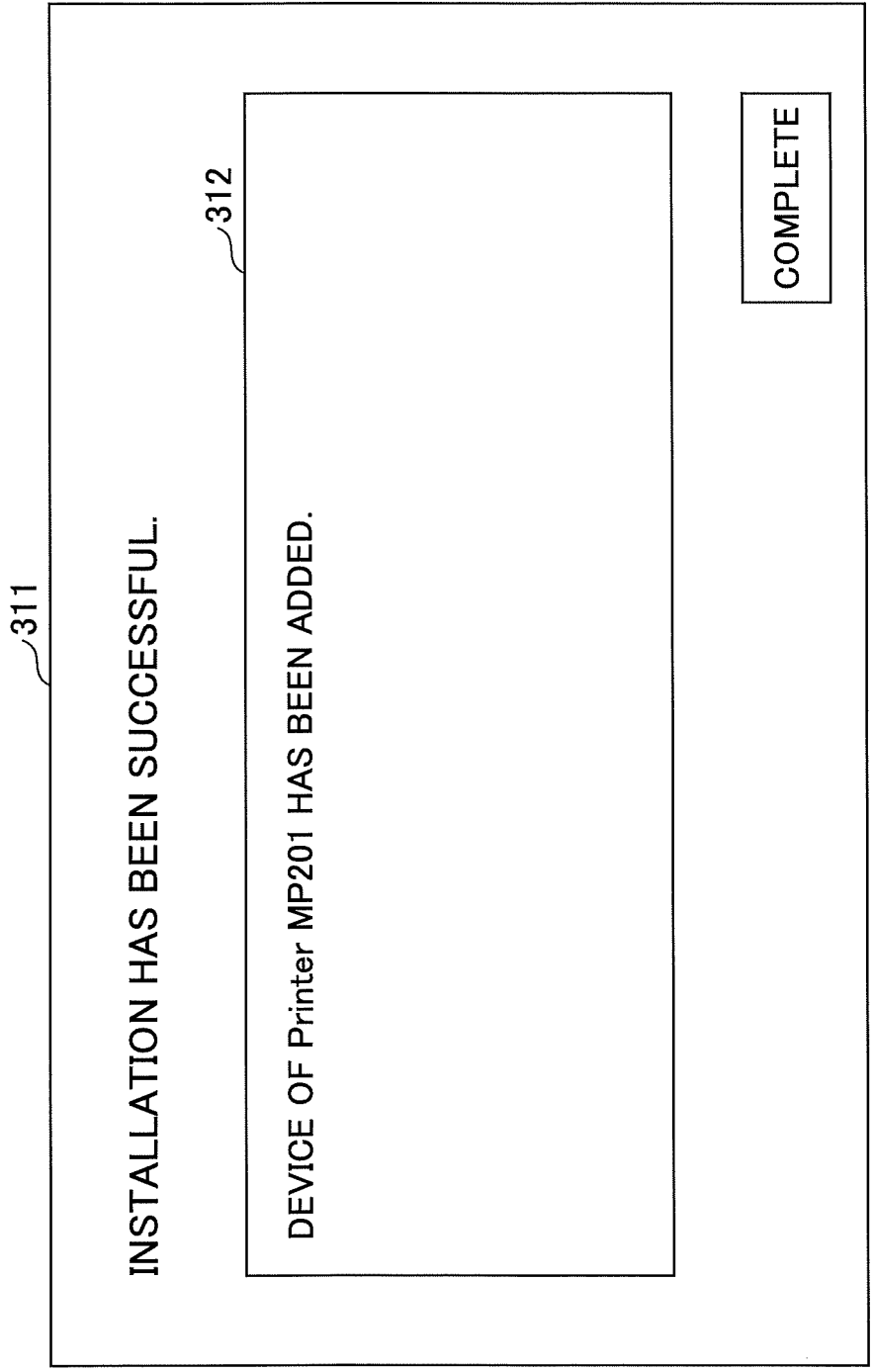

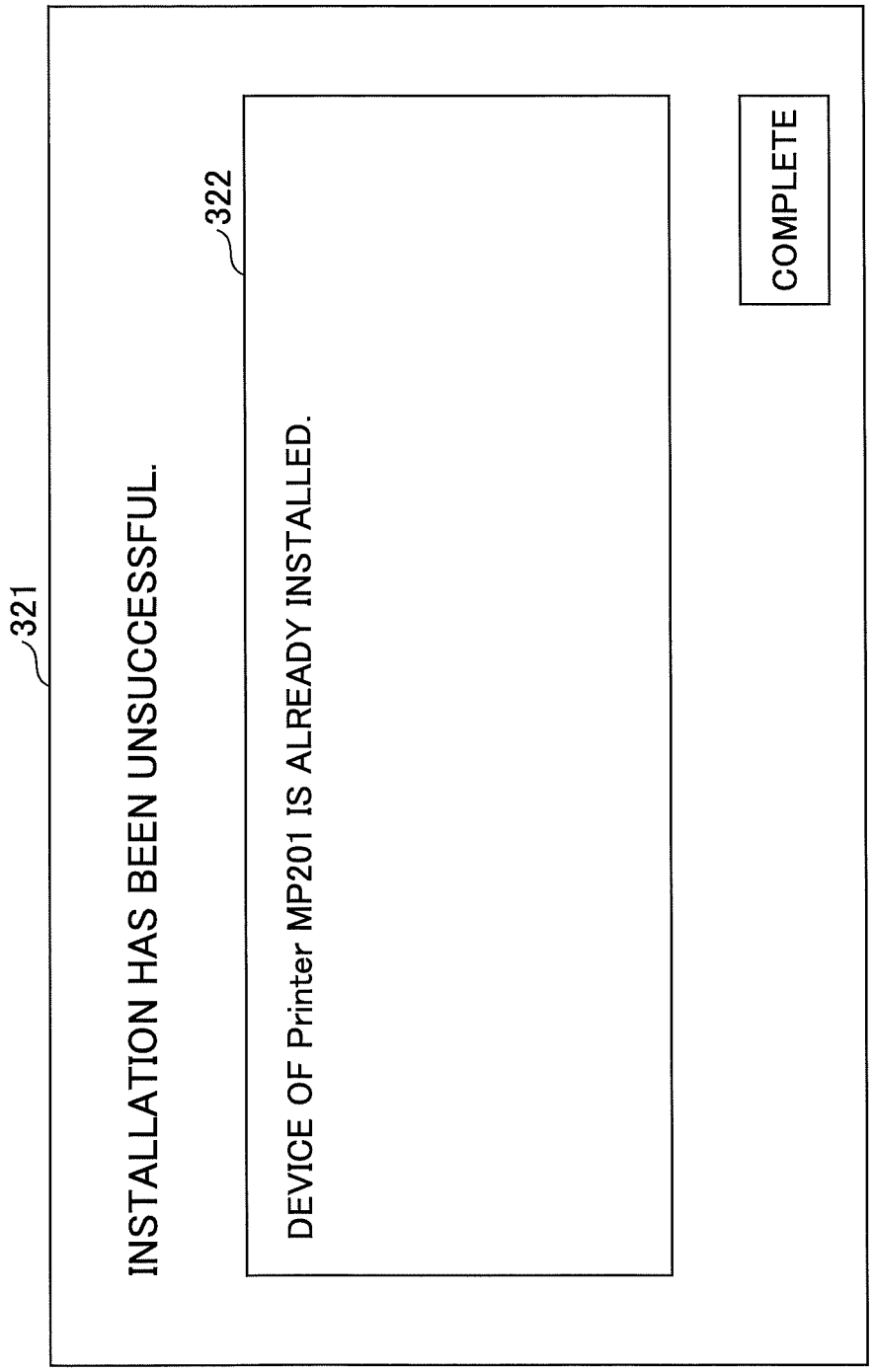

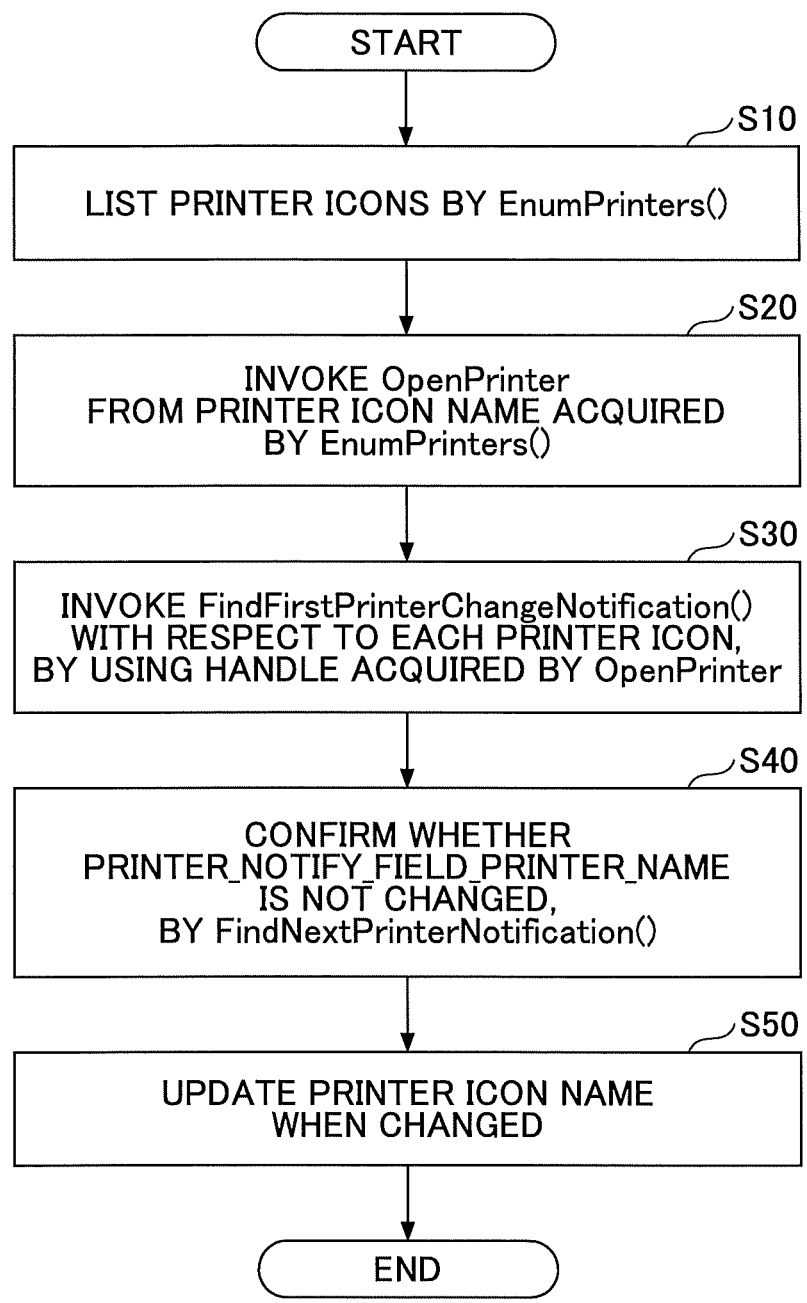

INFORMATION PROCESSING APPARATUS, INSTALLATION METHOD, AND RECORDING MEDIUM

CROSS-REFERENCE TO RELATED APPLICATION

The present application claims priority under 35 U.S.C. § 119 to Japanese Patent Application No. 2017-020495, filed on Feb. 7, 2017, the contents of which are incorporated herein by reference in their entirety.

BACKGROUND OF THE INVENTION

1. Field of the Invention

The present invention relates to an information processing apparatus, an installation method, and a recording medium.

2. Description of the Related Art

There is known a technique (plug & play) of installing a control program of an electronic device, by an operating system (OS) of an information processing apparatus, when an electronic device such as a printer is connected to the information processing apparatus. In order to increase the effectiveness of plug & play, control programs of various electronic devices are bundled with the OS in advance, and these control programs are stored in a predetermined folder. The control program stored in a predetermined folder is referred to as "a control program bundled with the OS". The OS preferentially searches for and installs the control program stored in this folder.

When the user connects a new electronic device to the information processing apparatus, the user causes the information processing apparatus to execute an installer stored in a storage medium or downloaded from a network. When the installer prompts a connection by a universal serial bus (USB) cable, etc., between the information processing apparatus and the electronic device, and the user makes the connection, the OS acquires identification information of the electronic device by plug & play, searches for the control program, which is most suitable for the connected electronic device, from among the control programs bundled with the OS and stored in the predetermined folder, and automatically installs the search-found control program.

In this way, while plug & play is convenient, the installation process progresses automatically, and therefore there may be cases where the control program cannot be installed in the form desired by the user (see, for example, Patent Document 1). In the information processing apparatus disclosed in Patent Document 1, in order to prevent unintended overwriting of a control program by plug & play, it is determined whether a second control program, which has already been installed, will be in an incompatible state, due to a first control program that will be installed upon receiving identification information of the electronic device.

Patent Document 1: Japanese Unexamined Patent Application Publication No. 2003-084984

SUMMARY OF THE INVENTION

An aspect of the present invention provides an information processing apparatus, an installation method, and a recording medium, in which one or more of the disadvantages of the related art are reduced.

According to one aspect of the present invention, there is provided an information processing apparatus in which a program corresponding to an electronic device is installed in response to the electronic device being connected to the information processing apparatus, the information processing apparatus including a processor, in communication with a memory, executing a process including collecting information relating to a first program already installed in the information processing apparatus; acquiring identification information of the electronic device from the electronic device connected to the information processing apparatus; and determining whether to install a second program identified by the identification information, by using the information relating to the first program identified from the identification information, wherein the second program is of a different version than a version of the first program, and the second program is included in a storage medium or a device connected to the information processing apparatus.

BRIEF DESCRIPTION OF THE DRAWINGS

FIGS. 1A and 1B are diagrams for describing an installation method according to a comparison example;

FIGS. 2A and 2B are diagrams for describing an installation method according to a first embodiment of the present invention;

FIGS. 19A and 19B are diagrams respectively illustrating examples of an installation successful screen and an error report screen according to the third embodiment of the present invention;

FIG. 20 is an example of a flowchart illustrating a procedure in which the control unit detects the change of the printer icon name according to a fourth embodiment of the present invention.

DETAILED DESCRIPTION OF THE PREFERRED EMBODIMENTS

Figure 2B:
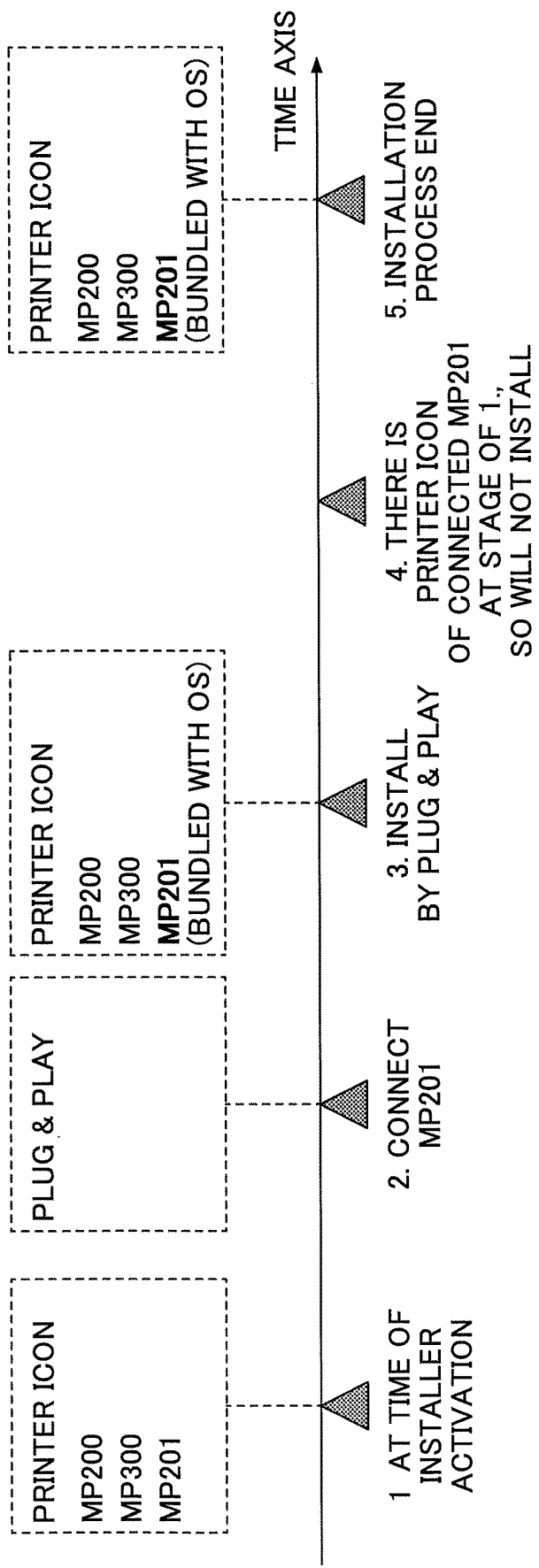

In the method of installing a control program of the related art, there is a problem that inconvenience may arise in automating the installation of the control program. When the user connects the electronic device to the information processing apparatus with a USB cable, etc., it is preferable to automatically install a control program corresponding to the connected electronic device, by the OS and other application software, etc. However, there may be cases where the information processing apparatus does not include the newest version of the control program corresponding to the model of the connected electronic device, as the control program that corresponds to the model of the connected electronic device. Instead, the information processing apparatus may only include a control program bundled with the OS (a control program created before the model of the electronic device has been released), or an old version of the control program that has been downloaded by the user in the past.

In such a situation, when the user connects the electronic device with the information processing apparatus, the electronic device is identified by plug & play, but an old control program corresponding to the electronic device (a control program bundled with the OS, or an old version of the control program downloaded in the past) may be installed. In this way, depending on the control program, it may not be preferable to install the control program automatically.

Depending on the OS, the OS may have a function of replacing an installed old control program with the newest control program, and therefore it is considered to execute a procedure in which the installer uses this function to replace the old control program with the new control program. However, there is a possibility that the user is intentionally using the old control program, and the installer cannot determine whether the old control program is to be deleted.

As described above, in the related art, it has not been possible to determine whether to install the newest control program automatically, and in some cases, it has been difficult to automate the installation.

A problem to be solved by an embodiment of the present invention is to provide an information processing apparatus that reduces inconveniences caused by installation of a control program.

Embodiments of the present invention will be described by referring to the accompanying drawings.

[Comparison Example of Installation Method]

With reference to FIGS. 1A and 1B, an installation method indicated as a comparison example, to be compared with the installation method according to the present embodiment, will be described. Note that the procedure of FIGS. 1A and 1B is not necessarily prior art. FIG. 1A illustrates the installation of a control program in time series.

1. The user activates, in the information processing apparatus, an installer stored in a storage medium. The printer icon names expressing the control programs, which are installed in the information processing apparatus at this time point, are MP200 and MP300. The printer icon name and the printer icon will be described later with reference to FIG. 7.

2. The installer displays a screen prompting the user to connect a printer to be newly used by the user, with the information processing apparatus. A printer to be newly used by the user is referred to as a new printer, and the user connects MP201 that is a new printer, to the information processing apparatus.

3. When the user connects the new printer with the information processing apparatus, plug & play is activated, and a control program, for example, bundled with the OS (possibly not the newest version), is installed. Although the present embodiment is not limited to a control program common to all models, as a description will be given of a control program that is common to all models, an example that is easy to understand. The control program of the printer MP201 is common to all models, and control programs corresponding to both new printers and old printers are stored as control programs bundled with the OS. The control programs bundled with the OS are control programs of various electronic devices collected by the manufacturer of the OS when the OS is shipped. The control programs bundled with the OS are not necessarily the newest control programs. The control programs bundled with the OS are stored in a predetermined folder determined by the OS.

4. In this way, since the installer installs the old control program bundled with the OS, the newest control program of the new printer is not installed.

Next, the installation method in the case where the installer replaces the control program bundled with the OS, will be described with reference to FIG. 1B.

1. The user activates, in the information processing apparatus, an installer stored in a storage medium. The printer icon names expressing the control programs, which are installed in the information processing apparatus at this time point, are MP200, MP300, and MP201. MP201 is not the newest control program exclusively used for a printer MP201, but a control program bundled with the OS (for example, a control program common to all models), and is a printer icon name of a printer older than the new printer (a different model from the new printer).

2. The installer displays a screen prompting the user to connect the new printer MP201 with the information processing apparatus. The user connects the MP201 to the information processing apparatus.

3. The installer attempts to install the old control program bundled with the OS; however, because a printer icon for the new printer MP201 already exists, the installer cannot create a new printer icon, the installer does not install a new control program in the form of an old control program. In particular, when the OS of the information processing apparatus is Windows (registered trademark) and the connection is a USB-connection, it is not possible to set plural printer icons for one printer.

4. In order to address a situation as described in 3., the installer replaces the old control program associated with the printer icon name of MP201, with a new control program.

5. The newest control program is associated with the printer icon named MP201.

However, since the control program associated with the printer icon MP201 is replaced with the newest control program from the old control program, the control program used up to now will be changed regardless of the intention of the user. If the control program changes, the display, etc., on the print setting screen may change, which may result in poor usability for the user.

First Embodiment

<Installation Method—First Embodiment>

With reference to FIGS. 2A and 2B, an installation method by an installer according to the present embodiment, will be described. First, a description will be given of FIG. 2B.

1. The user activates, in the information processing apparatus, an installer stored in a storage medium. The installer acquires the printer icon names expressing the control programs, which are installed in the information processing apparatus at this time point (the printer icon names are MP200, MP300, and MP201).

2. The installer displays a screen prompting the user to connect a new printer with the information processing apparatus. The user connects MP201 that is the new printer, to the information processing apparatus.

3. When the user connects the new printer with the information processing apparatus, plug & play is activated, the installer attempts to install the old control program bundled with the OS. However, because a control program having a printer icon name MP201 is already installed, the installer does not install a control program in the form of an old control program. That is, the control program of MP201 that is the new printer is common to all models, and a control program of an old printer different from MP201 is bundled with the OS and already installed.

4. The control program of MP201 that is the new printer is MP201; however, if the user is already using this control program, at the stage of 1., a printer icon having a printer icon name MP201 would have already existed. An information processing apparatus 10 determines whether to install a control program, by acquiring the model name from the MP201 that is the new printer and determining whether a printer icon corresponding to MP201 existed at the stage of 1. If a printer icon, corresponding to MP201 that is the new printer, existed at the stage of 1., this control program is not a control program installed after the activation of the installer, and therefore there is a possibility that the user is using this control program. Therefore, the installer does not install the newest control program corresponding to MP201 that is the new printer.

FIG. 2B illustrates a case where a printer icon corresponding to MP201 that is the new printer already existed at the stage of 1., and the installer does not install the newest control program. There are cases where only one printer icon can be created by plug & play due to specifications of the OS; in the present embodiment, the control program is not replaced, and therefore it is possible to prevent a situation where the control program that the user has been using up to now is changed regardless of the intention of the user.

As described above, when the user is using an old control program, a new control program is not installed, and therefore it is possible to prevent a situation where the control program is changed without the knowledge of the user.

Next, a description is given of FIG. 2A. The processes of 1. to 3. are the same as those of FIG. 2B. However, the printer icon names existing at the stage of 1. are MP200 and MP300.

4. When a printer icon corresponding to MP201 that is the new printer did not exist at the stage of 1., the installer once again acquires the printer icons (MP200, MP300, and MP201) of control programs installed in the information processing apparatus.

Then, a difference from the printer icons acquired at 1. is detected, and therefore at the stage of 4., "there is a printer icon corresponding to MP201 that is the new printer", so in this case the newest control program is installed. More preferably, in a case where the printer icon that did not exist at 1. is "a control program bundled with the OS", the newest control program is installed. When at least one of these cases is satisfied, there is a high possibility that an old control program bundled with the OS has been installed by plug & play. It is assumed that FIG. 2A satisfies this condition. When at least one of these cases is satisfied, there is a high possibility that the user is not intentionally using a printer icon corresponding to the new printer, and there is a high possibility that the user intentionally has not installed a control program associated with this printer icon. Note that when both of the cases are satisfied, there is a high possibility that an old control program bundled with the OS has been installed by plug & play.

The installer replaces the old control program already installed, with a new control program.

5. The new control program will be associated with the printer icon of MP201.

By the above condition that at the stage of 4., "there is a printer icon corresponding to MP201 that is the new printer", it can be determined that an old control program has been installed by plug & play. Furthermore, by the above condition that the printer icon that did not exist at 1. is "a control program bundled with the OS", it can be determined that the control program to be installed is more suitable. Thus, the newest control program can be installed, instead of an old control program in the predetermined folder.

As described above, the installer according to the present embodiment can appropriately determine whether to automatically install the newest control program, and therefore it is possible to reduce inconveniences caused by installation of a control program.

Terms

A control program is a program used by the information processing apparatus to control the electronic device. Since the method of controlling the electronic device varies from electronic device to electronic device, the information processing apparatus has to control an electronic device by a method unique to each electronic device. The control program is software for adding, to the OS, a function of controlling the electronic device, and provides, to the OS, a means for using the function of the electronic device with an abstracted interface. By providing the means for operating the electronic device by the control program, it is possible to eliminate the need for the OS to operate various electronic devices. As a specific example of the control program, a device driver is known. The device driver of a printer may be referred to as a printer driver.

Install means to add software to the information processing apparatus and to make the software usable. Install may be expressed as "introduce" or "set up".

Information relating to a first control program is information relating to a first control program installed in the information processing apparatus and acquirable from the information processing apparatus. More specifically, the information relating to a first control program is information that can identify the first control program, or the number of times the first control program has been used. In the present embodiment, a term "information relating to a printer icon" will be used as the information relating to a first control program.

The identification information of the electronic device is information for identifying the electronic device. The identification information suffices as long as the electronic device can be identified to the extent that the control program to be installed can be identified. For example, the identification information of the electronic device is the model information of the electronic device, more specifically, the model name, and identification information associated with the model name, etc. In the present embodiment, the terms "MANUFACTURE name" and "MODEL name" are used.

A second control program is a control program to be installed in the information processing apparatus.

<System Configuration Example—First Embodiment>

Figure 3:
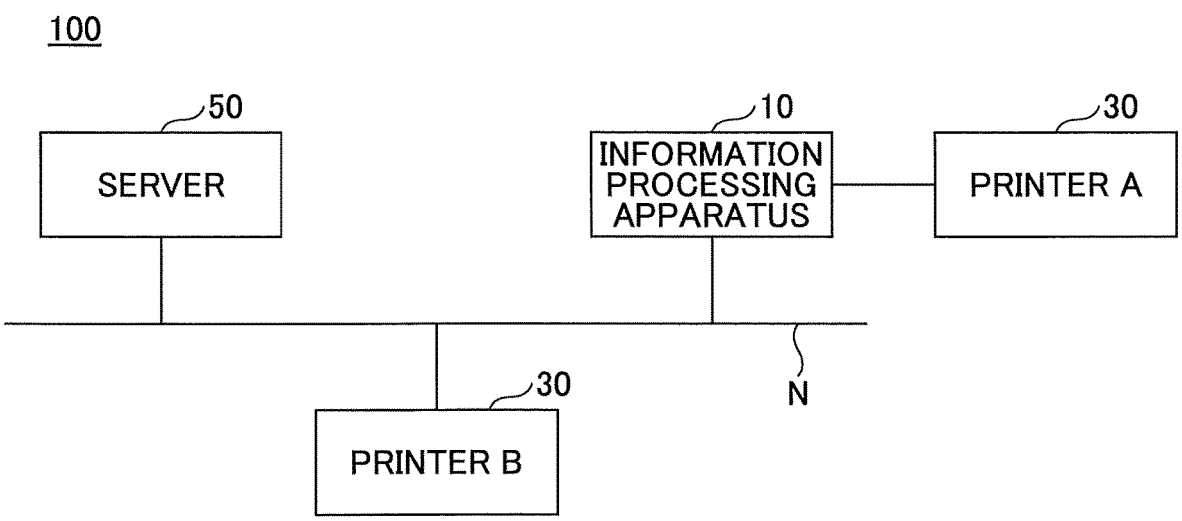
FIG. 3 is an example of a schematic configuration diagram of an information processing system according to the first embodiment of the present invention.

FIG. 3 is an example of a schematic configuration diagram of an information processing system 100. The information processing system 100 illustrated in FIG. 3 includes a server 50, the information processing apparatus 10, and one or more printers 30. The printer 30 connected by an exclusive-use line is referred to as the printer A 30, and the printer 30 connected by a network is referred to as the printer B 30.

The information processing apparatus 10 and the printer A 30 are connected by Peer to Peer (one-on-one) with an exclusive-use line such as a Universal Serial Bus (USB) cable. However, there is no need for the information processing apparatus 10 and the printer A 30 to always be in a connected state, and the user can detach and attach the exclusive-use line. Furthermore, the exclusive-use line may be provided with an interface for generating plug & play. Other than the USB cable, for example, a personal computer (PC) card, Peripheral Component Interconnect (PCI), Institute of Electrical and Electronics Engineers (IEEE) 1394, and small computer system interface (SCSI), etc., are available.

Furthermore, as long as plug & play is supported, the information processing apparatus 10 and the printer A 30 may be connected so as to be capable of wireless communication. Bluetooth (registered trademark), a wireless local area network (LAN) in an ad hoc mode, and wireless fidelity (WiFi)-Direct wireless LAN, etc., are available as the wireless communication for connecting by Peer To Peer.

The information processing apparatus 10 is communicably connected to the server 50 and the printer B 30 via a network N. This network N is, for example, a LAN installed in a facility where the printers A and B 30 are installed, a wide area Ethernet (registered trademark), a wide area network (WAN) in which a plurality of LANs are connected by a router, etc., and the Internet, etc. The network N may be constructed so as to be either wired or wireless, or a combination of wired and wireless. Furthermore, in the case of a wireless network, a network of communication standards such as third generation (3G), fourth generation (4G), or Long Term Evolution (LTE) may be included.

The information processing apparatus 10 is an apparatus or a device on which an Operating System (OS), a control program, and application software are executed. The information processing apparatus 10 is often referred to as a computer. Specifically, for example, a Personal Computer (PC), a smartphone, a tablet terminal, a Personal Digital Assistant (PDA), a wearable PC, etc., are given as examples. Besides the above, any apparatus or device compatible with plug & play and capable of executing a control program, may be used.

The printers A and B 30 are apparatuses for forming an image on a sheet material such as paper. The printer 30 is sometimes referred to as a printing apparatus or an image forming apparatus. In addition to the function of forming an image, the printer 30 may have one or more functions among a function of fax transmission and reception, and a function of a scanner reading an image of a document. When the printers A and B 30 have a plurality of functions, the printers A and B 30 are referred to as multifunction peripherals (MFP).

The printers A and B 30 are merely examples of electronic devices compatible with the installation of a control program by plug & play. As an electronic device compatible with the installation of a control program by plug & play, for example, a device with USB as an interface may be used. Also, there are a video card, a mouse, a web camera, and a keyboard, etc.

Since the printer B 30 is connected to the network N, the printer B is preferably compatible with universal plug & play. Since the printer B 30 is compatible with universal plug & play, when the printer B 30 is connected to the network N, the control program of the printer B 30 is installed in the information processing apparatus 10. The series of processes of plug & play are as indicated in Table 1; however, necessary processes are performed whether the printer 30 is connected by an exclusive-use line or by a network.

TABLE 1

| PROCESS | TCP/IP(NETWORK) | USB(Plug & Play) |
|---|---|---|
| PLACE DRIVER AT PREDETERMINED POSITION IN HDD | USE INSTALLER TO PLACE IN HDD (IN Windows (REGISTERED TRADEMARK), PLACE AT POSITION REFERRED TO AS Driver Store) | SAME AS ON THE LEFT |
| CREATE PORT | INSTALLER CREATES PORT (IN Windows, THERE IS AddPort FUNCTION) | WHEN Plug & Play OCCURS, AUTOMATICALLY CREATED |

TABLE 1-continued

| PROCESS | TCP/IP(NETWORK) | USB(Plug & Play) |
|---|---|---|
| DESCRIBE INFORMATION NECESSARY FOR REGISTRY IN OS MANAGEMENT | INSTALLER INSTRUCTS OS (IN Windows, THERE IS AddPrinter) | SAME AS ABOVE |
| (OS) CREATES ICON | CREATED WHEN PROCESSES ABOVE ↑ ARE ENDED | CREATED WHEN PROCESSES ABOVE ↑ ARE ENDED |

In the following description, unless otherwise specified, the case where the control program of the printer A 30 is installed, will be described as an example.

The server 50 is a general information processing apparatus (computer) that stores a control program. The Internet Protocol (IP) address of the server 50 is set in advance in the information processing apparatus 10, and when the printer A 30 is connected for installing a control program, the information processing apparatus 10 acquires a control program corresponding to the printer A 30, from the server 50. Accordingly, when the control program is stored in a storage medium, the server 50 may be omitted. The server 50 is preferably compatible with cloud computing. Cloud computing is a usage mode in which resources on the network are used without being conscious of specific hardware resources.

<<Printer Hardware—First Embodiment>>

Figure 4:
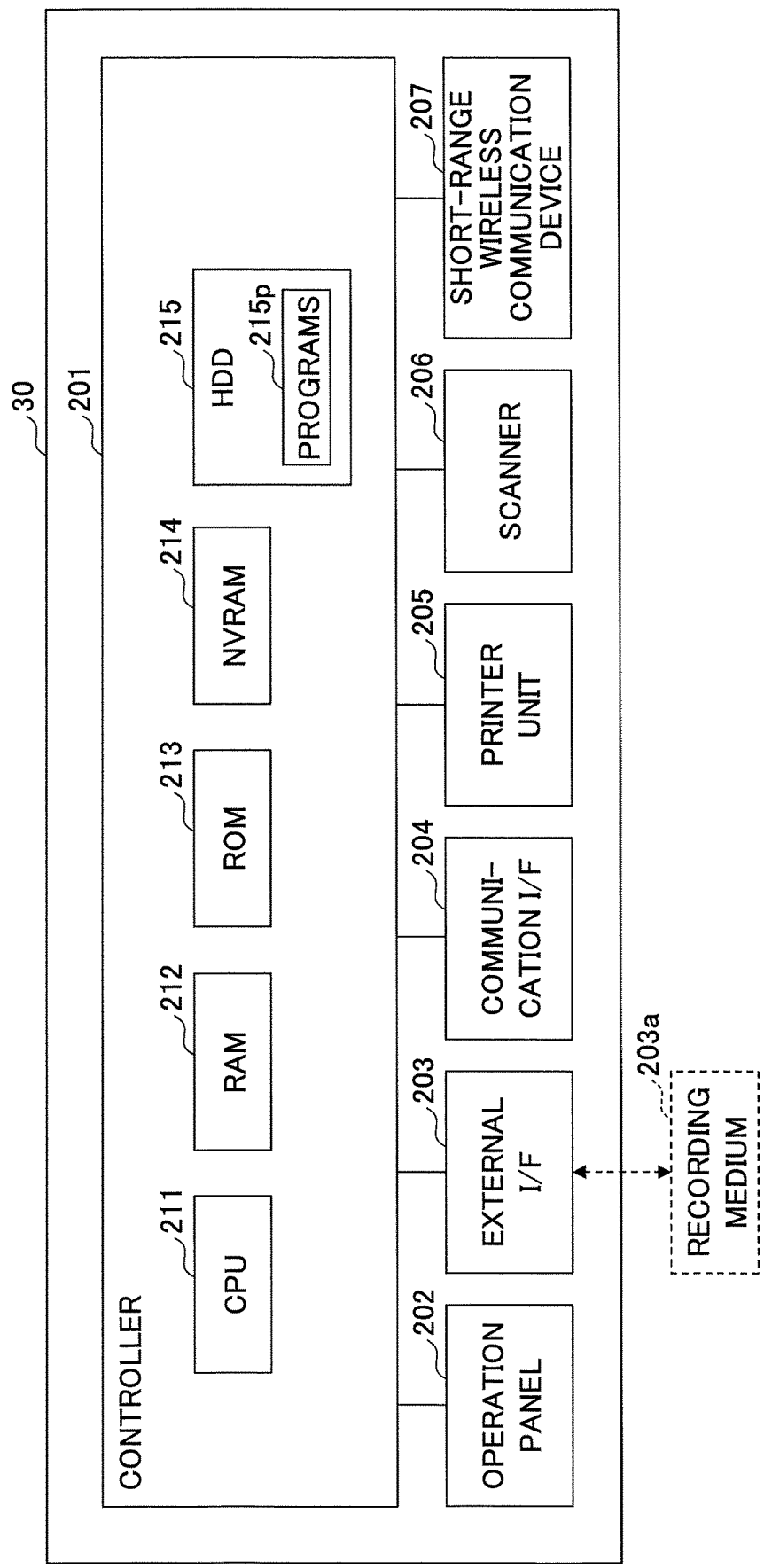
FIG. 4 is an example of a hardware block diagram of a printer according to the first embodiment of the present invention.

The printer 30 according to the present embodiment is implemented by a hardware configuration as illustrated in FIG. 4, for example. FIG. 4 is an example of a hardware block diagram of the printer 30 according to the present embodiment. The printer 30 illustrated in FIG. 4 includes a controller 201, an operation panel 202, an external interface (I/F) 203, a communication I/F 204, a printer unit 205, a scanner 206, and a short-range wireless communication device 207.

The controller 201 includes a central processing unit (CPU) 211, a random access memory (RAM) 212, a read-only memory (ROM) 213, a non-volatile RAM (NVRAM) 214, and a hard disk drive (HDD) 215. The ROM 213 stores various programs and data. The RAM 212 temporarily holds programs and data. The NVRAM 214 stores, for example, setting information, etc. Furthermore, the HDD 215 stores various programs 215p and data.

The CPU 211 loads the program 215p, data, and setting information, etc., from the ROM 213, the NVRAM 214, and the HDD 215, etc., into the RAM 212, and executes processes, thereby implementing control and functions of the entire printer 30.

The operation panel 202 includes an input unit for accepting input from the user and a display unit 26 (including a touch panel) for displaying information. The external I/F 203 is an interface with an external device. The external I/F 203 is, for example, a USB I/F, and the information processing apparatus 10 is connected as an external device. Furthermore, the external device includes a recording medium 203a, etc. Note that the recording medium 203a includes a flexible disk, a compact disc (CD), a digital versatile disc (DVD), a secure digital (SD) memory card, and a USB memory, etc.

The communication I/F 204 is an interface for performing communication via the network N. The printer B 30 is connected to the information processing apparatus 10 via the network N.

The printer unit 205 is a printing device for printing and outputting print target data. The scanner 206 is a reading device that optically reads a document and converts the document into electronic data.

The short-range wireless communication device 207 is a communication device according to the communication standard of Near Field Communication (NFC) or Bluetooth (registered trademark), for example. For example, in the case of NFC, the short-range wireless communication device 207 is may be referred to as a reader/writer.

<<Hardware of Information Processing Apparatus 10—First Embodiment>>

Figure 5:
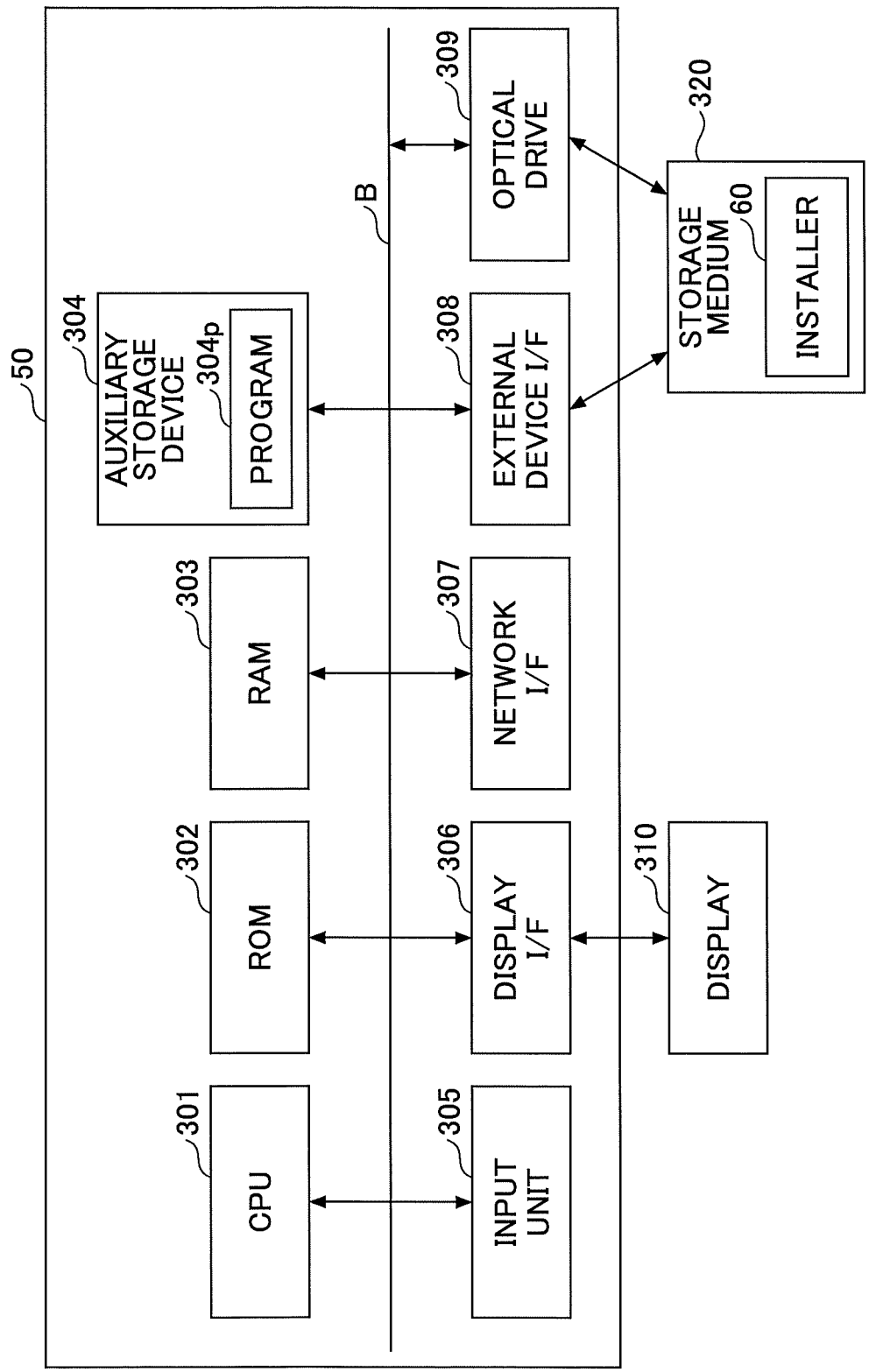
FIG. 5 is an example of a hardware block diagram of an information processing apparatus according to the first embodiment of the present invention.

FIG. 5 is an example of a hardware block diagram of the information processing apparatus 10. The information processing apparatus 10 includes a CPU 301, a ROM 302, a RAM 303, and an auxiliary storage device 304. Furthermore, the information processing apparatus 10 includes an input unit 305, a display I/F 306, a network I/F 307, an external device I/F 308, and an optical drive 309. Note that the respective units of the information processing apparatus 10 are mutually connected via a bus B. In this way, the information processing apparatus 10 has functions of a general computer.

The CPU 301 executes various programs 304p stored in the auxiliary storage device 304, and an OS, etc. The ROM 302 is a nonvolatile memory. The ROM 302 stores a system loader and data, etc.

The RAM 303 is a main storage device such as a Dynamic Random Access Memory (DRAM) or a Static Random Access Memory (SRAM). When executed by the CPU 301, the program 304p stored in the auxiliary storage device 304 is loaded in the RAM 303, and the RAM 303 serves as a work area of the CPU 301.

The auxiliary storage device 304 stores the program 304p is executed by the CPU 301 and various databases used when the program 304p is executed by the CPU 301. The auxiliary storage device 304 is a nonvolatile memory such as an HDD or a Solid State Drive (SSD), for example.

The input unit 305 is an interface for an operator to input various instructions to the information processing apparatus 10. For example, the input unit 305 includes a keyboard, a mouse, a touch panel, and a voice input device, etc. However, the input unit 305 may be connected according to need.

In response to a request from the CPU 301, the display I/F 306 displays, on a display 310 that is a display device, various kinds of information held by the information processing apparatus 10 in the form of a cursor, a menu, a window, a character, and an image, etc. The display I/F 306 is, for example, a graphic chip or a display I/F. However, the display I/F 306 may be connected according to need.

The network I/F 307 is a communication device that communicates with the printer B 30 via the network N. The network I/F 307 is, for example, an Ethernet (registered trademark) card; however, the network I/F 307 is not limited as such. The network I/F 307 connects to the network N, for example.

The external device I/F 308 is an interface for connecting a USB cable or various kinds of storage media 320 such as a USB memory. The printer A 30 is connected to the external device I/F 308. The optical drive 309 is a device for reading and writing information from the storage medium 320 such as a CD, a DVD, or a Blu-lay disc. An installer 60 is stored in the storage medium 320. The installer 60 includes a control program, but in the case where the control program is acquired from the server 50, the control program may not be included.

<Functions—First Embodiment>

Figure 6A:
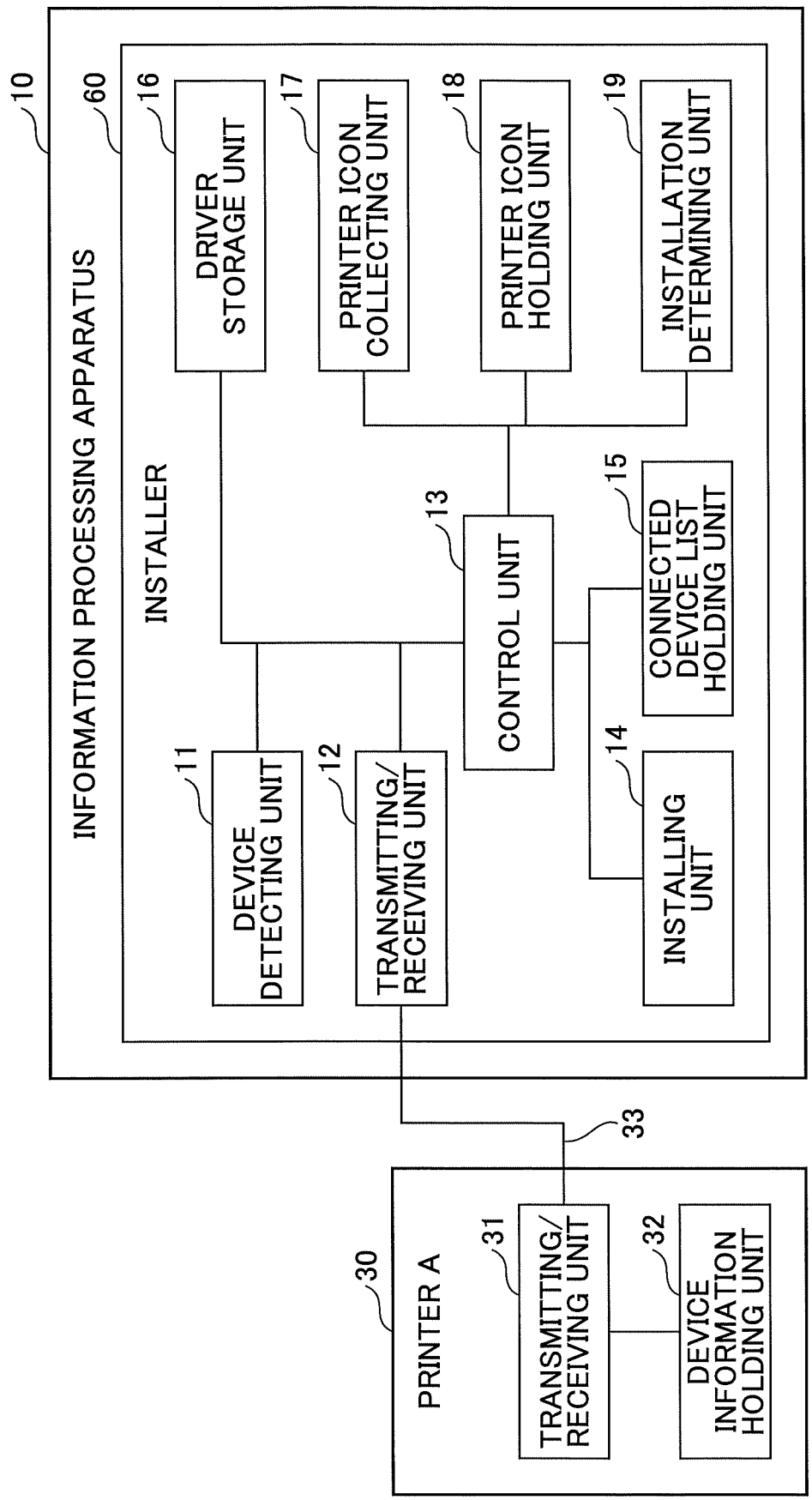
FIGS. 6A and 6B are examples of functional block diagrams of the printer and the information processing apparatus included in the information processing system according to the first embodiment of the present invention.

FIG. 6A is an example of a functional block diagram of the printer 30 and the information processing apparatus 10 included in the information processing system 100.

First, the printer 30 includes a transmitting/receiving unit 31 and a device information holding unit 32. These functional units included in the printer 30 are functions or means that are implemented by operating one of the constituent elements illustrated in FIG. 4 according to an instruction from the CPU 211 in accordance with a program loaded in the RAM 212 from the HDD 215.

The transmitting/receiving unit 31 is implemented as the CPU 211 illustrated in FIG. 4 executes the program 215p and controls the external I/F 203, etc. The transmitting/receiving unit 31 communicates with the information processing apparatus 10 via an exclusive-use line 33. When the printer A 30 is connected, the information held by the device information holding unit 32 is transmitted to the information processing apparatus 10 by plug & play. When the printer B 30 is connected, the transmitting/receiving unit 31 is implemented as the CPU 211 illustrated in FIG. 4 executes the program 215p and controls the communication I/F 204, etc.; the functions are the same as those of the case of the printer A 30.

The device information holding unit 32 is implemented as the CPU 211 illustrated in FIG. 4 executes the program 215p and reads information using the ROM 213, the NVRAM 214, and the HDD 215. The device information holding unit 32 corresponds to a configuration register to be described later. The device information holding unit 32 holds the MANUFACTURE name and the MODEL name, and provides this information in response to a request from the transmitting/receiving unit 31. The MANUFACTURE name may be referred to as the manufacturer name of the electronic device, the provider name, or the name of the distributor. The MODEL name may be referred to as the model name, product name, or model number of the electronic device.

More specifically, the MANUFACTURE name and the MODEL name are stored as IDs for identifying this information. In the present embodiment, as a matter of simplifying the description, the terms MODEL name and MANUFACTURE name will be used. Note that ID is an abbreviation for Identification, meaning an identifier or identification information. An ID is a name, a symbol, a character string, a numerical value, or a combination of one or more of these information items, which are used for uniquely distinguishing a particular target from a plurality of targets.

The information processing apparatus 10 includes a device detecting unit 11, a transmitting/receiving unit 12, a control unit 13, an installing unit 14, a connected device list holding unit 15, a driver storage unit 16, a printer icon collecting unit 17, a printer icon holding unit 18, and an installation determining unit 19. These functional units included in the information processing apparatus 10 are functions or means that are implemented by operating one of the constituent elements illustrated in FIG. 5 according to an instruction from the CPU 301 in accordance with a program loaded from the auxiliary storage device 304 to the RAM 303.

The transmitting/receiving unit 12 is implemented as the CPU 301 illustrated in FIG. 5 executes the installer 60 and the OS, and controls the external device I/F 308, etc. The transmitting/receiving unit 12 communicates with the printer 30. In the present embodiment, the transmitting/receiving unit 12 acquires the MANUFACTURE name and the MODEL name from the printer 30.

The device detecting unit 11 is implemented as the CPU 301 illustrates in FIG. 5 executes the installer 60 and the OS, etc. The device detecting unit 11 determines the model of the connected printer 30 according to the MANUFACTURE name and the MODEL name acquired by the transmitting/receiving unit 12.

The connected device list holding unit 15 is implemented as the CPU 301 illustrated in FIG. 5 executes the installer 60, and by the RAM 303 and the auxiliary storage device 304, etc., illustrated in FIG. 5. The connected device list holding unit 15 holds the MANUFACTURE name and the MODEL name acquired by the transmitting/receiving unit 12. When a plurality of printers 30 are connected, the connected device list holding unit 15 holds the MANUFACTURE name and MODEL name of all of the printers 30. Accordingly, the connected device list holding unit 15 can hold a list of the connected printers 30.

The driver storage unit 16 implemented as the CPU 301 illustrated in FIG. 5 executes the installer 60, and by the storage medium 320, etc., illustrated in FIG. 5. The driver storage unit 16 holds the newest control program of the printer 30.

The installing unit 14 is implemented as the CPU 301 illustrated in FIG. 5 executes the installer 60, etc. The installing unit 14 installs the control program of the driver storage unit 16.

The control unit 13 is implemented as the CPU 301 implemented in FIG. 5 executes the installer 60, etc. The control unit 13 implements control regarding the entire installation process.

The printer icon collecting unit 17 is implemented as the CPU 301 illustrated in FIG. 5 executes the installer 60, etc. The printer icon collecting unit 17 collects information relating to printer icons already installed in the information processing apparatus 10.

The printer icon holding unit 18 is implemented as the CPU 301 illustrated in FIG. 5 executes the installer 60, and by the RAM 303 and the auxiliary storage device 304, etc., illustrated in FIG. 5. The printer icon holding unit 18 holds information relating to the printer icons collected by the printer icon collecting unit 17.

The installation determining unit 19 is implemented as the CPU 301 illustrated in FIG. 5 executes the installer 60, etc. Based on the information of the printer icon holding unit 18 and the model name detected by the device detecting unit 11, the installation determining unit 19 determines whether it is possible to install the newest control program. Furthermore, the installation determining unit 19 determines whether there is "a printer icon corresponding to the new printer MP201" and whether "the control program is bundled with the OS", and determines whether it is possible to install the newest control program.

<<Another Example of Functional Block Diagram—First Embodiment>>

Figure 6B:
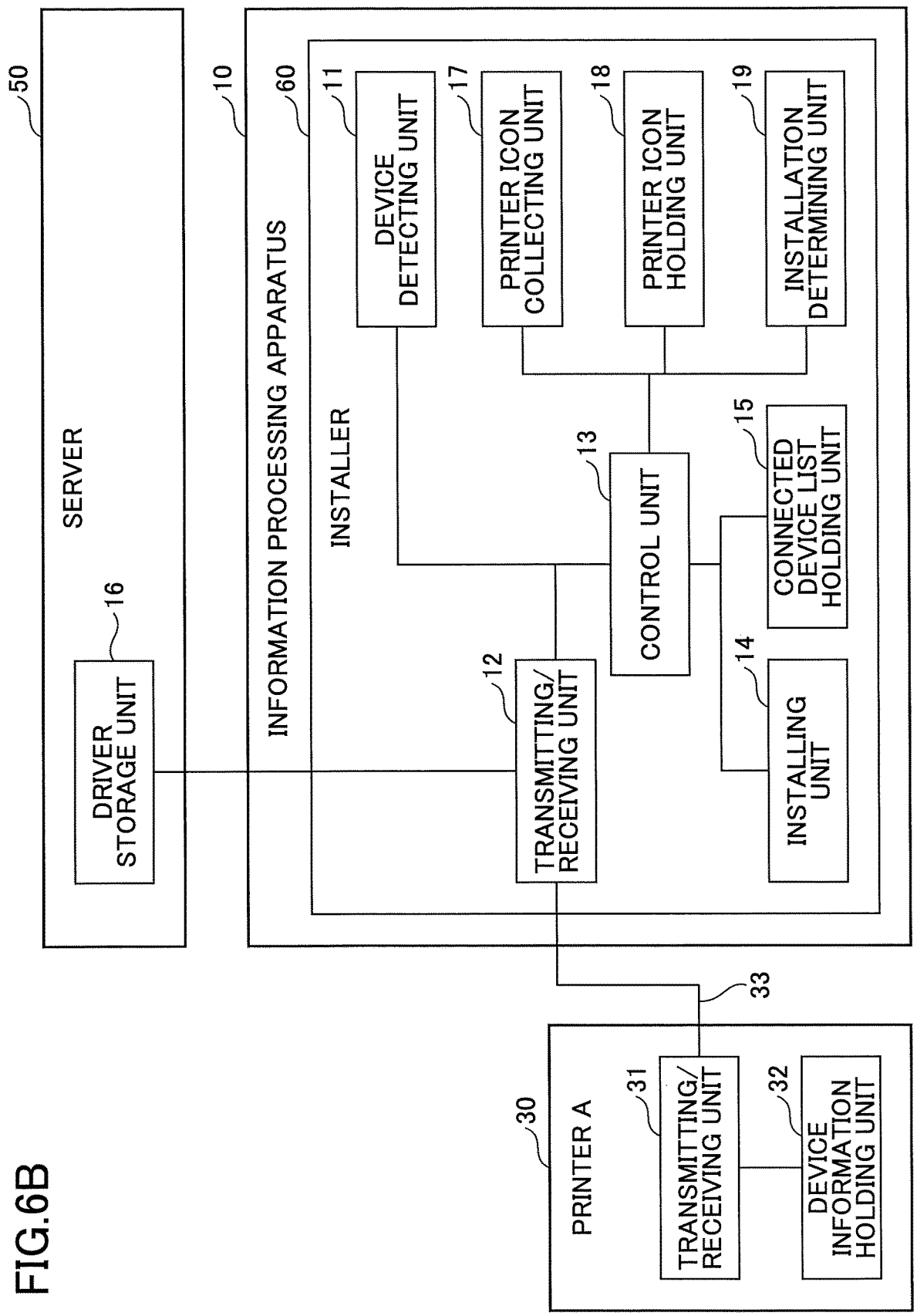

As illustrated in FIG. 6B, the information processing apparatus 10 may acquire the control program from the server 50. Upon identifying the model of the printer A 30, the information processing apparatus 10 downloads the newest control program corresponding to the model, from the server 50.

The transmitting/receiving unit 12 of the information processing apparatus 10 makes a request to acquire a control program corresponding to the model of the printer A 30, from the server 50. Therefore, the server 50 includes the driver storage unit 16, and the information processing apparatus 10 may not include the driver storage unit 16.

<Printer Icon—First Embodiment>

Figure 7A:
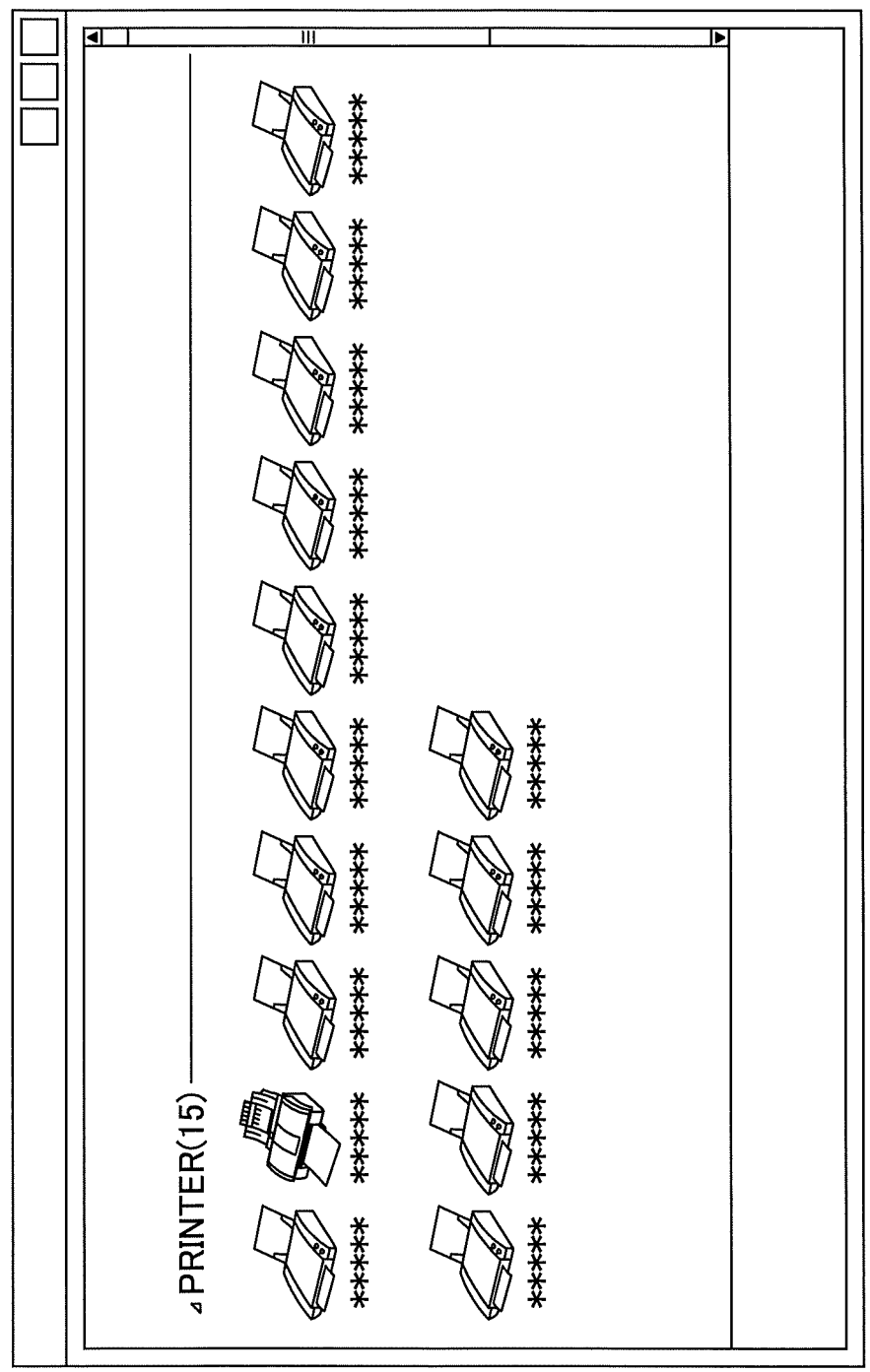
FIGS. 7A and 7B are examples of diagrams for describing a printer icon according to the first embodiment of the present invention.
Figure 7B:
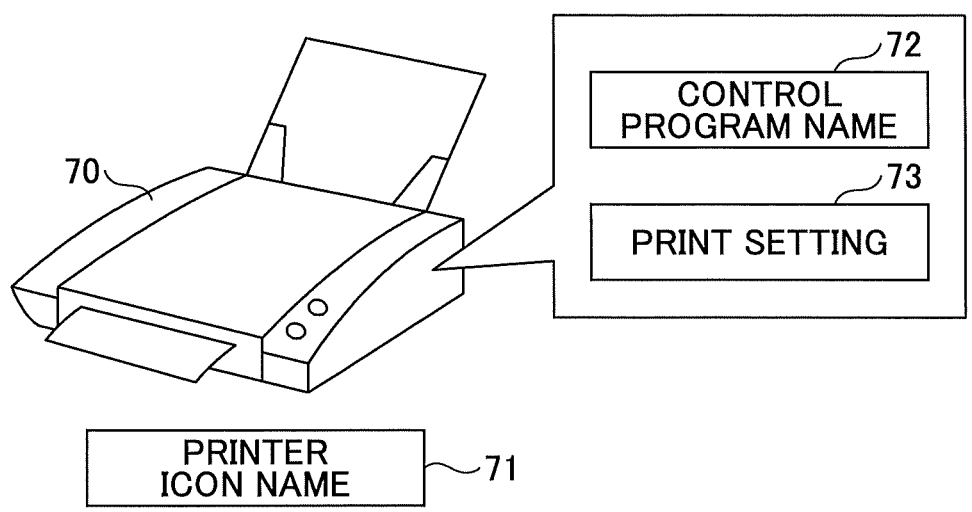

FIGS. 7A and 7B are examples of diagrams for describing a printer icon 70. FIG. 7A illustrates a list of the printer icons 70 displayed by the information processing apparatus 10, and FIG. 7B illustrates one of the printer icons 70. The printer icon 70 is a printer in the information processing apparatus 10 associated with information relating to the printer 30, and may be referred to as a logical printer.

When the control program is installed in the information processing apparatus 10, image data expressing the printer A 30 as illustrated, in order to visually display the printer A 30, is also installed from the installer 60 or a predetermined folder. In general, an icon means this image data; however, in the present embodiment, the printer icon 70 also includes information associated with the icon (image data).

The printer icon 70 is associated with each printer 30 by a port (an IP address and a USB port, etc.) of the printer 30 etc. Furthermore, each printer icon 70 holds the name (control program name 72) of the installed control program. Apart from this, the printer icon 70 holds a printer icon name 71. The control program name 72 is determined in advance. The printer icon name 71 is a display name (identification information) of the printer for recognizing the printer 30 that the user can use for printing, by this printer icon 70. The user can set any printer icon name 71 that is easy to distinguish, in consideration of the name of the product.

In many cases, the control program name 72 includes a model name by which printing can be performed by the control program. However, when the control program is common to all models, the control program name and the printer name may not match. For example, although the printer names (product names) are MP201A and MP201B, when a common control program common to all models is applied, the same control program name may be associated with the printer icons of both MP201A and MP201B.

A print setting 73 is associated with the printer icon 70. The print setting 73 may be a setting stored in a registry at the same time as the installation, or a setting that has been set last by the user. In addition to this, the printer icon 70 can hold information such as paper types that can be used and option settings acquired from the printer A 30. These information items are acquired by bidirectional communication at the time of the installation and these information items are stored in the information processing apparatus 10 at the same time as the installation of the control program.

In this way, the printer icon 70 holds the functions and settings of the printer 30 corresponding to the control program, and is not mere image data. Thus, the user can treat the printer icon 70 in the information processing apparatus 10 like the actual printer 30.

As described above, only one printer icon can be created by plug & play, due to the specification of the OS. For example, when there is the printer icon 70 having a printer icon name of MP201, and a control program, which corresponds to a printer using the same control program as the MP201, is installed by plug & play, the control program of the printer icon 70 having the printer icon name of MP201 is replaced the new control program.

<Plug & Play—First Embodiment>

Figure 8:
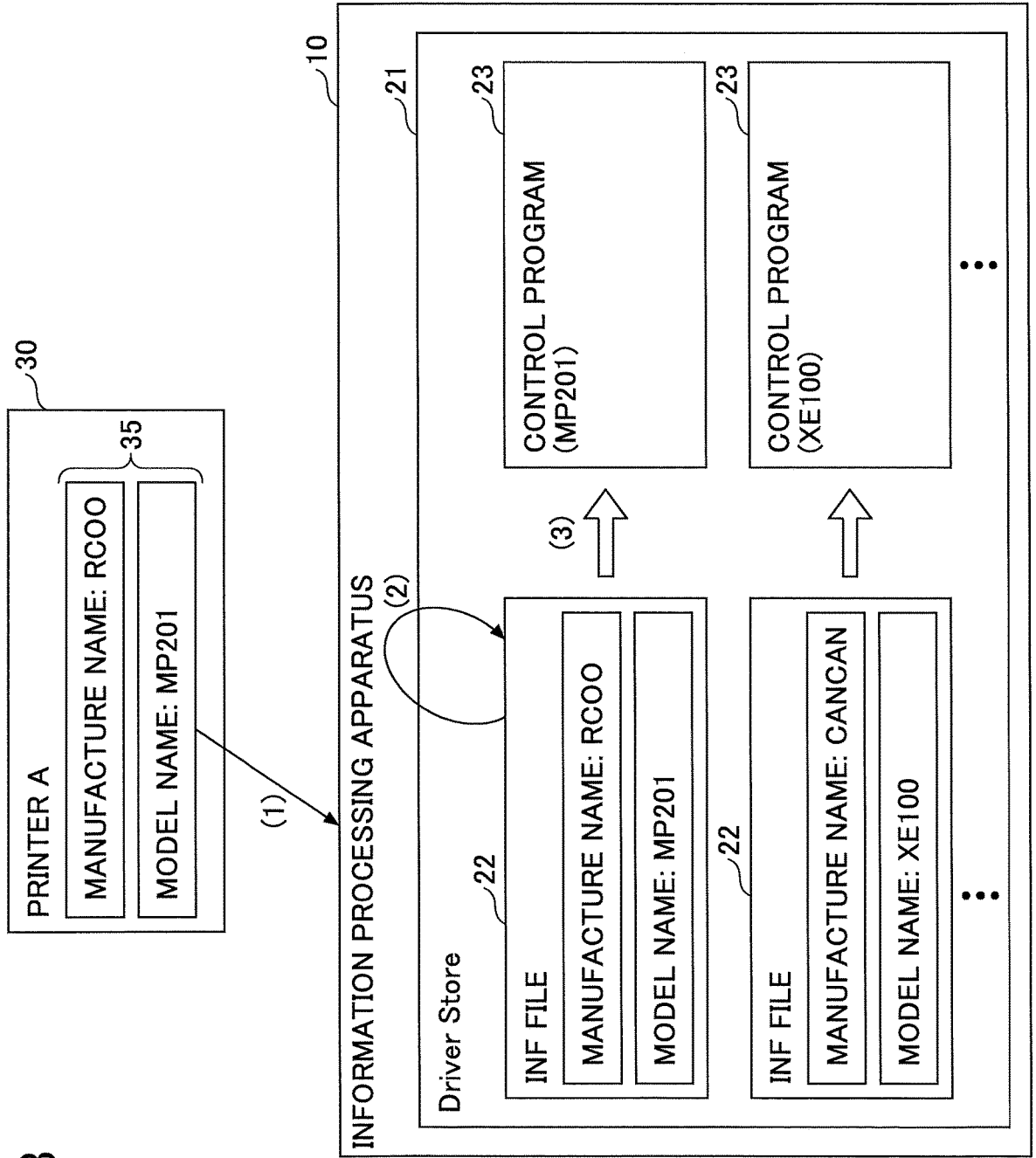
FIG. 8 is an example of a diagram for schematically describing plug & play according to the first embodiment of the present invention.

FIG. 8 is an example of a diagram for schematically describing plug & play. The printer 30 includes a storage means referred to as a configuration register 35, in which a MANUFACTURE name and a MODEL name are stored (PnP ID, to be described later). A control program bundled with the OS is stored in a predetermined folder (for example, a folder referred to as "Driver Store") in the information processing apparatus 10. The information processing apparatus 10 includes an INF file 22 and a control program 23 in a predetermined folder 21. The INF file 22 is a system definition file in which settings for installing software are described in the OS (mainly Windows (registered trademark, hereinafter omitted)). The INF file 22 describes the MANUFACTURE name and the MODEL name, and also describes the file to be used for copying the control program 23 of the printer 30 corresponding to the MANUFACTURE name and the MODEL name, and the folder in the information processing apparatus 10 to which this control program 23 is to be copied.

(1) When the plug & play function of the OS detects that the printer 30 is connected (at this point, it is detected that an electronic device is connected by a USB cable, without knowing the model name), the BIOS (Basic Input Output System) of the information processing apparatus 10 acquires the MANUFACTURE name and MODEL name from the configuration register 35 of the printer 30.

(2) The OS holds, in the predetermined folder 21, control programs of main electronic devices that are on the market at the time of shipment of the OS. The plug & play function searches the predetermined folder 21 for the INF file 22 including the MANUFACTURE name and the MODEL name acquired from the printer 30.

(3) When the corresponding INF file 22 is found, the installer 60 installs the control program 23 according to the setting (file) described in the INF file 22.

When the control program 23 is stored in the storage medium or the server, the INF file is stored in the same folder as the installer, and therefore the installer installs the control program 23 from this folder. Also, the installed control program 23 and the INF file are copied to the predetermined folder 21, so that the next time, the same control program 23 can be installed without a storage medium or a server.

Note that the OS referred to as Windows is described as one example; any OS supporting plug & play can be suitably applied to the present embodiment.

<Operation Procedure—First Embodiment>

Figure 9:
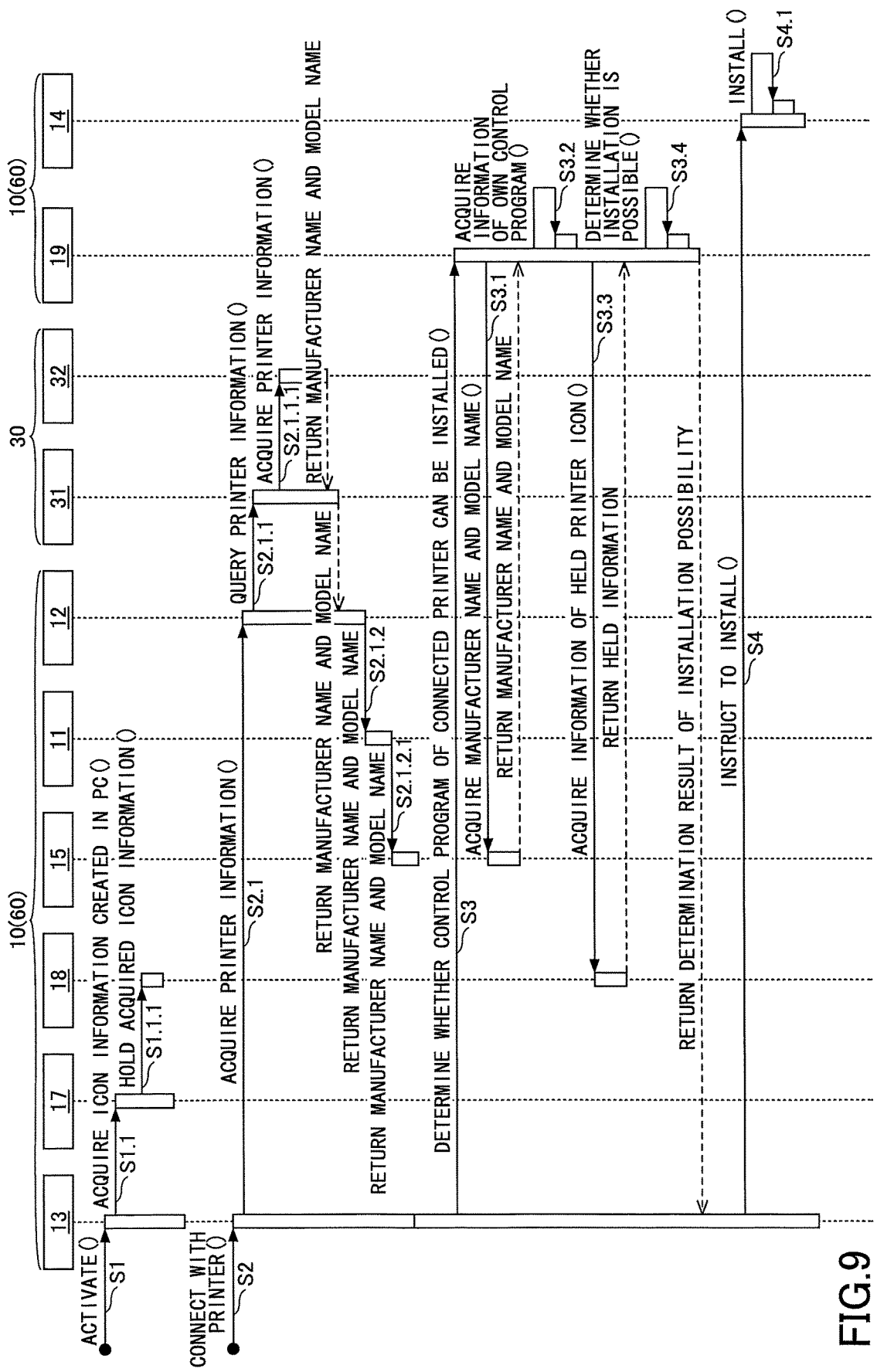
FIG. 9 is an example of a sequence diagram illustrating a procedure in which the information processing apparatus installs the control program according to the first embodiment of the present invention.

FIG. 9 is an example of a sequence diagram illustrating a procedure in which the information processing apparatus 10 installs the control program.

Step S1: The user sets a storage medium in the external device I/F 308 or the optical drive 309 and activates the installer 60.

Step S1.1: The control unit 13 requests the printer icon collecting unit 17 to collect information (printer icon name, control program name, and port name) relating to each printer icon 70 already included in the information processing apparatus 10 at the time of starting installation.

Step S1.1.1: The printer icon collecting unit 17 collects information relating to each printer icon 70. In the OS referred to as Windows, when using the function of Windows Application Programming Interface (API) referred to as EnumPrinters ( ) information of the printer icon 70 created in the information processing apparatus 10 can be acquired. EnumPrinters( ) can acquire the information of a structure referred to as PRINTER_INFO_2, and can acquire information of PRINTER_INFO_2 of all the printer icons 70 (all the printer icons that have been created at the time of activating the installer 60). PRINTER_INFO_2 includes members referred to as pPrinterName, pDriverName, and PPortName, corresponding to a printer icon name, a control program name, and a port name, respectively. Table 2 indicates a list of printer icon names, control program names, and port names collected by the printer icon collecting unit 17.

TABLE 2

| NO. | PRINTER ICON NAME | CONTROL PROGRAM NAME | PORT NAME |
|---|---|---|---|
| 1 | OEM Printer M101 | OEM Printer M101 | 10.20.30.40 |
| 2 | OEM Printer M101_2 | OEM Printer M101 | USB001 |
| 3 | OEM Printer MP200 | OEM Class Driver | USB002 |
| 4 | OEM Printer MP300 | OEM Class Driver | USB003 |

Table 2 indicates information of the printer icons 70 expressing the control programs installed in the information processing apparatus 10. Table 2 indicates that four control programs are installed.

Referring back to FIG. 9, the processes from step S2 to S2.1.2.1 will be described.

Step S2: The user receives an instruction from the installer 60 and connects the printer A 30 and the information processing apparatus 10, for example, with a USB cable.

Steps S2.1 to S2.1.2: When the printer A 30 is connected, plug & play operates, and the control unit 13 acquires printer information (MANUFACTURE name and MODEL name) from the printer A 30. Specifically, with an API provided in Windows, the following is invoked.

```
SetupDiGetClassDevs( )
    → SetupDiEnumDeviceInterfaces( )
    → SetupDiGetDeviceInterfaceDetail( )
    → CreateFile( )
    → DeviceIoControl( )
```

Accordingly, the MANUFACTURE name and the MODEL name of the printer A 30 are acquired.

First, by specifying {0x28d78fad, 0x5a12, 0x11d1, {0xae, 0x5b, 0x0, 0x0, 0xf8, 0x3, 0xa8, 0xc2}} in the GUID to be transferred to SetupDiGetClassDevs( ), the device information is narrowed down to that of the printer A 30 connected via USE, and the device information is acquired. This GUID specifies a printer among USE-connected electronic devices, and GUID is determined by the standard of IEEE 1284.

Next, by using SetupDiEnumDeviceinterfaces( ) by using the device information acquired by the installer 60, the device interface can be acquired. Next, by using the acquired device interface, SetupDiGetDeviceInterfaceDetail( ) is used, such that detailed information of the device interface can be acquired. Next, a handle is created from a path included in the detailed information of the device interface with CreateFile( ), and the created handle is used to use DeviceIoControl( ), such that an IEEE 1284 Device ID String can be acquired.

IEEE 1284 is an IEEE standard defining bidirectional parallel communication between a computer and another electronic device. The Device ID String is information including an ID for identifying an electronic device. The Device ID String includes a MANUFACTURE name and a MODEL name. The device detecting unit 11 acquires the MANUFACTURE name and the MODEL name from a determined position in the Device ID String.

The sequence diagram indicates that the transmitting/receiving unit 12 of the information processing apparatus 10 communicates with the transmitting/receiving unit 31 of the printer A, and acquires the MANUFACTURE name and the MODEL name from the device information holding unit 32. However, specifically, the above API performs the processing.

Step S2.1.2.1: The device detecting unit 11 holds the printer information (MANUFACTURE name and MODEL name) in the connected device list holding unit 15. Table 3 indicates the acquired printer information.

TABLE 3

| NO. | MANUFACTURE | MODEL |
|---|---|---|
| 1 | RCOO | Printer MP201 |

Table 3 is an example of printer information acquired from the printer A 30. It can be seen that the printer A 30 has a MANUFACTURE name of RCOO and a MODEL name of Printer MP201. There are various manufacturers of printers connected by a USB cable; however, the installer 60 can normally only support printers of the same company (own company). Therefore, the control unit 13 may delete only the printer information other than that of MODEL names of the own company (company name of own company) supported by the installer 60, and only display printer information having a MODEL name of the own company. MODEL names of the own company are already known to the manufacturer, and are thus included in the installer 60. Alternatively, the installer 60 may send a query to a predetermined server such as the server 50.

Referring back to FIG. 9, the processes of steps S3 to S4 will be described.

Step S3: The control unit 13 requests the installation determining unit 19 to determine whether the control program of the connected printer A 30 can be installed.

Step S3.1: The installation determining unit 19 acquires the MANUFACTURE name and the MODEL name from the connected device list holding unit 15.

Step S3.2: The installation determining unit 19 acquires information relating to the control program held by the installer 60. For example, the installation determining unit 19 is to acquire the control program name.

Step S3.3: The installation determining unit 19 acquires information relating to the printer icon 70 held by the printer icon holding unit 18.

Step S3.4: The installation determining unit 19 determines whether installation is possible. A specific determination method will be described later with reference to FIG. 10. The installation determining unit 19 returns the determination result of whether installation is possible, to the control unit 13. Here, it is assumed that the installation determining unit 19 determines that installation is possible.

Step S4: The control unit 13 instructs the installing unit 14 to perform the installation.

Step S4.1: The installing unit 14 installs the control program.

<Method of Determining Whether Installation is Possible—First Embodiment>

Figure 10:
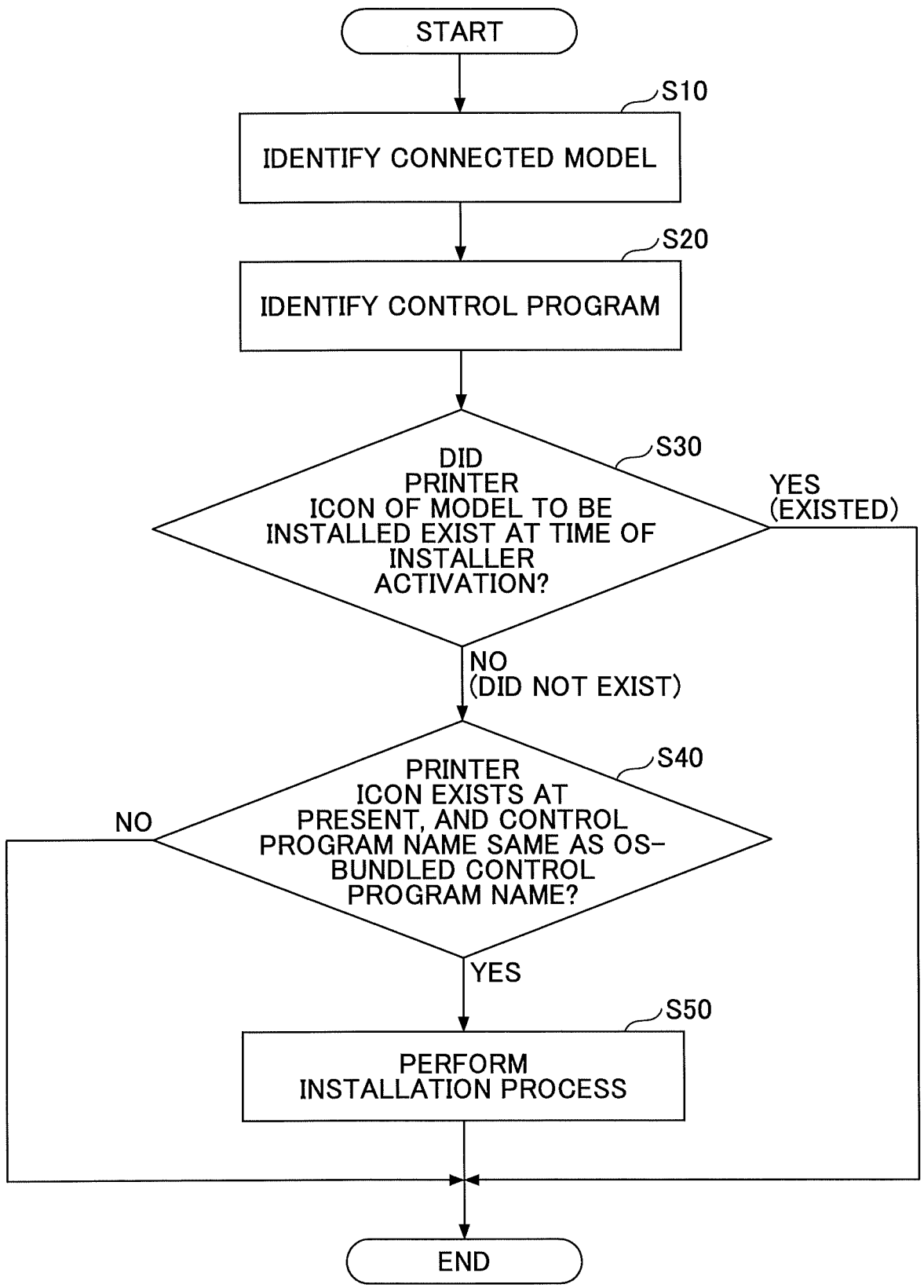
FIG. 10 is an example of a flowchart illustrating a procedure in which an installation determining unit determines whether to install the control program according to the first embodiment of the present invention.

FIG. 10 is an example of a flowchart illustrating a procedure in which the installation determining unit 19 determines whether to install the control program.

The installation determining unit 19 acquires the MANUFACTURE name and the MODEL name from the connected device list holding unit 15 (step S10). In Table 3, since only one printer A 30 is connected to the information processing apparatus 10, the MANUFACTURE name and the MODEL name are uniquely determined. Among these, the MODEL name includes the model (for example, MP201).

Since the model in which the control program is to be installed is known by the MODEL name, the installation determining unit 19 identifies the control program (step S20). In the INF file 22, a PnP ID, which is generated from the MANUFACTURE name and the MODEL name, is described. The PnP ID is information including "port+vendor name+model name+SUM value". The vendor name is the MANUFACTURE name or a similar name, and the model name is the MODEL name or a similar name. Therefore, the model name of PnP ID corresponds to the model name.

The installation determining unit 19 restores the model name by deleting the parts other than the model name from the PnP ID, and searches for the same model name as the MODEL name acquired from the printer A 30. When there is the same model name as the MODEL name acquired from the printer A 30, the installation determining unit 19 identifies the control program specified for that model name, by the INF file. When the installation determining unit 19 determines to install the control program, this control program is installed.

Next, the installation determining unit 19 determines whether the printer icon 70 of the model to be installed, existed at the time of activation of the installer 60 (step S30). The installation determining unit 19 acquires the printer icon names and the control program names held by the printer icon holding unit 18 indicated in Table 2, and determines whether there is a printer icon of the model to be installed, in the acquired names. Since a model name is included in the printer icon name and the control program name, the installation determining unit 19 can make the determination based on whether the MODEL name acquired from the printer A 30 is included in the printer icon name or the control program name.

That is, the installation determining unit 19 can determine whether it is possible to identify the printer icon 70, from the model name of the model to be installed.

When the printer icon 70 existed at the time of activation of the installer 60, it is highly likely that the a connection has once been made with the printer A 30 in the past, and the control program is already being used, and therefore the installation determining unit 19 determines not to install a new control program (not to replace the control program).

Next, even when the printer icon 70 did not exist at the time of activation of the installer 60, in order to cause the installer 60 to recognize the MANUFACTURE name and the MODEL name, the user may connect the printer A 30 to the information processing apparatus 10, and plug & play may be performed, and the printer icon 70 may be created. In order to be prepared for this case, the installation determining unit 19 once again acquires information relating to the printer icon 70 included in the information processing apparatus 10 at this timing. Then, the installation determining unit 19 determines whether the printer icon 70 of the model to be installed exists. The determination method may be the same as that of step S30.

When there is the printer icon 70 at this time point, the installation determining unit 19 determines whether the control program name held by the printer icon 70 is the same as the control program name bundled with the OS (step S40). It can be determined whether the control program name is the same as the control program name bundled with the OS, by determining whether the control program name is the same as the control program name that the installer 60 is going to install (acquired in step S3.2 in FIG. 9). When the control program is common to all models, the control program names will be the same. However, when the control program is not common to all models, the names may not be the same, and therefore the installer 60 holds, in advance, a list, etc., of names of control programs that are highly likely to be control programs bundled with the OS. The installation determining unit 19 compares this list with the control program name held by the printer icon 70.

Furthermore, it is also possible to make the determination at step S40 by using information of a version, etc., other than the name. When version information, etc., has been acquired in step S3.2, the installation determining unit 19 can determine whether the same control program as the control program to be installed, has been installed by plug & play. When the user has acquired the file of the newest control program in advance, the same control program as the control program to be installed may have been installed, depending on the setting of the inf file. Therefore, instead of "determining whether the control program is bundled with the OS" in step S40, the installation determining unit 19 may determine that an old program is installed when it is determined that the control program is not the same by using the information acquired in step S3.2, and the installer 60 may install the control program.

When there is no printer icon 70 of the model to be installed, or the control program name held by the printer icon 70 is not the same as the control program name bundled with the OS (NO in step S40), a control program that is most suitable for the model of the printer A 30 is installed, and therefore the installing process is not performed. The reason why the installing process is not performed is, as described above, only one printer icon is created using plug & play as in a USB connection, and therefore if the installation process is continued, the existing printer icon 70 will be deleted.

When there is the printer icon 70 of the model to be installed, and the control program name held by the printer icon 70 is the same as the control program name bundled with the OS (YES in step S40), it is certain that the control program to be installed is the control program most suitable for the user, and therefore the installation determining unit 19 determines to perform the installation process (step S50).

Installation of the control program will be described. When the printer A 30 is connected by the USB cable, the OS cannot create a printer icon unless a port requiring a plug & play function is created or a registry is written. For this reason, the installer 60 needs to copy the control program to a predetermined location, request a part of the installation process to the OS, and intentionally cause plug & play.

The installing unit 14 intentionally causes plug & play by using UpdateDriverForPlugAndPlayDevices( ) of Windows API, to associate the control program to be installed by the installer 60, with the printer icon 70 that did not exist at the time of activation of the installer 60 but that has been generated in step S40. According to this API, even if the user does not actually attach/detach the printer A 30 and the information processing apparatus 10, an event that indicates a connection between the printer A 30 and the information processing apparatus 10 is caused, and the OS can be caused to perform the port creation and rewriting of the registry, etc.

As another method of not invoking the plug & play process, the following method may be performed by using the information of the control program bundled with the OS.

The installing unit 14 invokes INstallPrinterDriverFromPackage( )→SetPrinter(') that is Windows API, to replace the printer icon 70 that has been created in association with the OS-bundled control program, with another control program. The advantage of this method is that the OS is not requested to perform part of the installation process, and therefore the time required for installation is shorter than the case of using UpdateDriverForPlugAndPlayDevices( ).

As a disadvantage of the above method, because an event of plug & play does not occur, DeviceDesc (description of device) and Mfg (inf file name and brand of driver) in the registry information (HKEY_LOCAL_MACHINE¥SYSTEM¥CurrentControlSet¥Enum¥USB PRINT¥printer name¥) are not changed. If other applications attempt to use these pieces of information, there is a possibility that a desired result cannot be obtained. Therefore, different kinds of information may be selectively used, i.e., when other applications that use this information are unlikely to operate, INstallPrinterDriverFromPackage( )→SetPrinter( ) may be used, and otherwise, UpdateDriverForPlugAndPlayDevices( ) may be used.

<Overview—First Embodiment>

As described above, when the user is using an old control program, the information processing apparatus 10 according to the present embodiment can determine not to install a new control program. When the user is not using an old control program, it is detected that a control program bundled with the OS has been installed by connecting a new printer, and a new control program can be installed.

Second Embodiment

In the present embodiment, the information processing apparatus 10 for determining whether to install a control program by referring to a usage record of a printer will be described.

Figure 11:
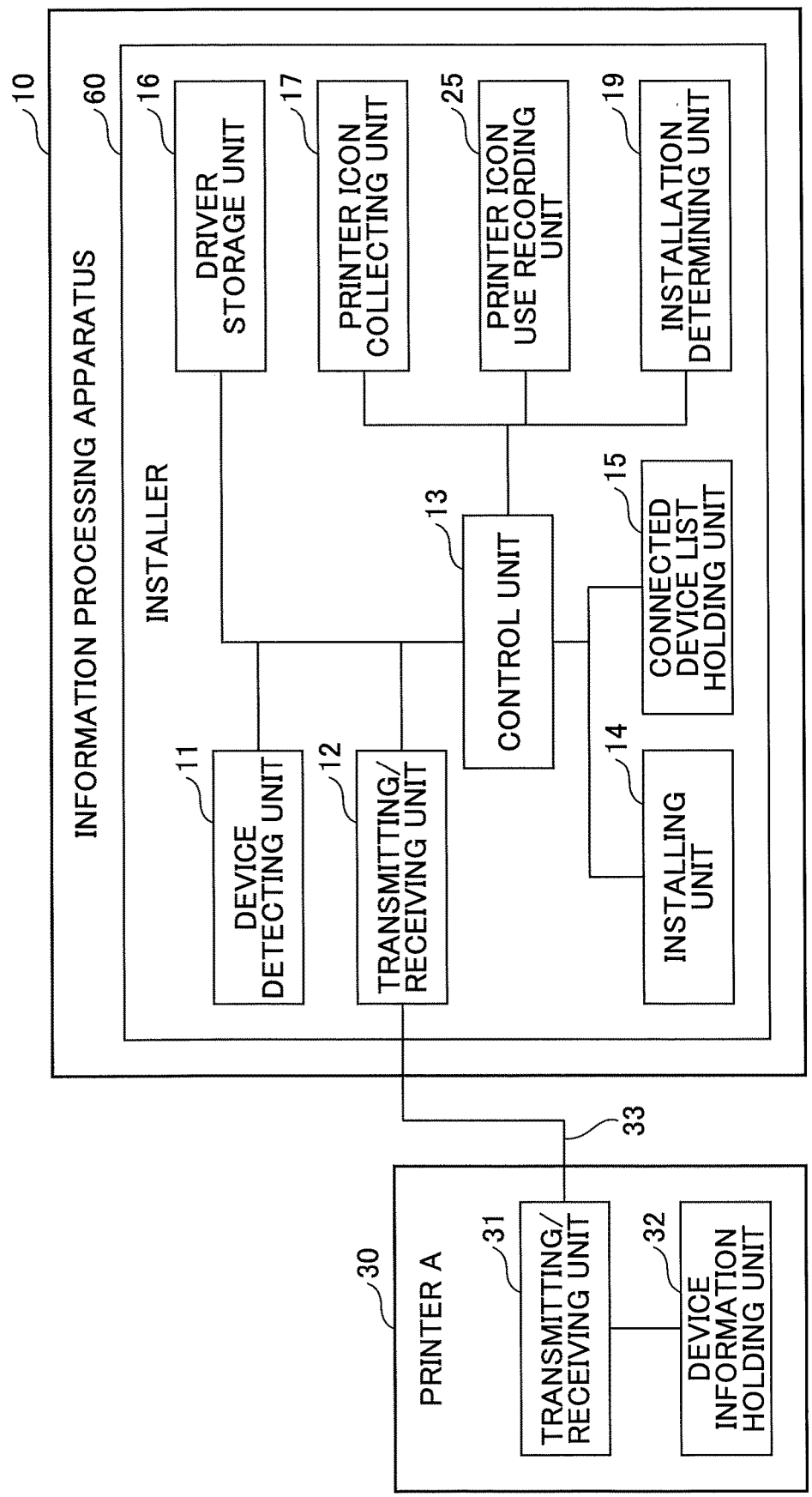
FIG. 11 is an example of a functional block diagram of the printer and the information processing apparatus included in the information processing system according to a second embodiment of the present invention.

FIG. 11 is an example of a functional block diagram of the printer A 30 and the information processing apparatus 10 included in the information processing system 100. In the description of FIG. 11, since the elements denoted by the same reference numerals as those in FIG. 6A perform the same functions, only the main elements of the present embodiment may be described.

The installer 60 according to the present embodiment has a printer icon use recording unit 25. The printer icon use recording unit 25 is implemented as the CPU 301 illustrated in FIG. 5 executes the installer 60, etc. The printer icon use recording unit 25 holds the number of times a control program has been used for printing, in association with a printer icon name and a control program name acquired by the printer icon collecting unit 17.

<Operation Procedure—Second Embodiment>

Figure 12:
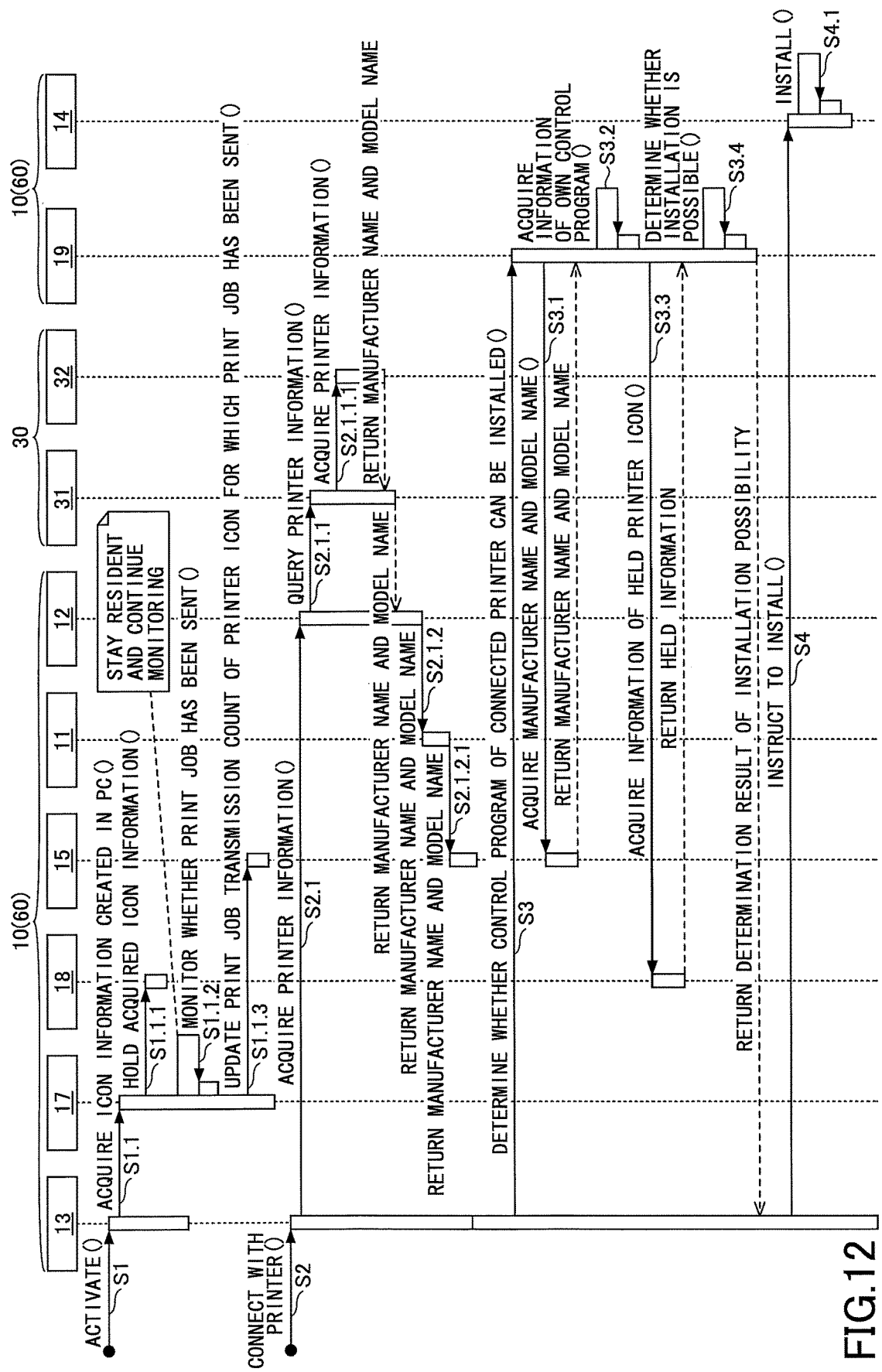
FIG. 12 is an example of a sequence diagram illustrating a procedure in which the information processing apparatus installs the control program according to the second embodiment of the present invention.

FIG. 12 is an example of a sequence diagram illustrating a procedure in which the information processing apparatus 10 installs the control program. In the description of FIG. 12, mainly the difference from FIG. 9 will be described. The procedure from steps S1 to S1.1.1 may be the same as those of FIG. 9. Table 4 indicates the printer icon names and the control program names acquired by the printer icon collecting unit 17.

TABLE 4

| PRINTER NO. | PRINTER ICON NAME | CONTROL PROGRAM NAME | PORT NAME | PRINT JOB TRANSMISSION COUNT |
|---|---|---|---|---|
| 1 | OEM Printer M101 | OEM Printer M101 | 10.20.30.40 | 1986 |
| 2 | OEM Printer M101_2 | OEM Printer M101 | USB001 | 521 |
| 3 | OEM Printer MP200 | OEM Class Driver | USB002 | 9721 |
| 4 | OEM Printer MP300 | OEM Class Driver | USB003 | 2751 |

Unlike the first embodiment, the print job transmission count is held in the printer icon use recording unit 25. The print job transmission count is the number of times the control program has transmitted the print job to the printer A 30. The print job transmission count is zero at the time of generating the printer icon 70, and the print job transmission count increases by one each time the control program transmits the print job to the printer A 30.

Referring back to FIG. 12, the description is continued.

Step S1.1.2: The printer icon collecting unit 17 monitors whether the print job has been transmitted to the printer A 30. The print job transmission count is counted by using the following method. Since all printer icon names installed in the information processing apparatus 10 are known by EnumPrinters( ), OpenPrinter( ) is invoked by using the printer icon names. The printer icon collecting unit 17 acquires the handles of the printer icons 70 with OpenPrinter( ) and uses the handles to invoke FindFirstPrinterChangeNotification( ) that gives a notification when there is a change in the printer icons 70. In order to have all changes notified when there is any change in the printer icons 70, PRINTER_CHANGE_ALL is specified in the second argument.

The printer icon collecting unit 17 stays resident and continuously monitors whether a print job has been transmitted (whether a control program has been used), by a repeated statement such as a "for statement".

Step S1.1.3: The printer icon collecting unit 17 sends the printer icon 70, which has transmitted the print job to the printer A 30, and the print job transmission count, to the connected device list holding unit 15. Specifically, the printer icon collecting unit 17 uses WaitForSingleObject (a Windows API that returns control when the specified object is in a signal state), to invoke FindNextPrinterChangeNotification( ) that acquires information of the notification of the actual change. When a print job is added, since PRINTER_CHANGE_ADD_JOB can be acquired by the second argument, the print job transmission count in Table 4 is increased by the acquisition frequency, and the print job transmission count is stored in the printer icon use recording unit 25.

In this manner, since the number of times the control program has been used is held in the printer icon use recording unit 25, it can be determined whether the user is using this control program.

The subsequent processes may be the same as those in FIG. 9. Accordingly, the printer information in Table 5 is held in the connected device list holding unit 15.

TABLE 5

| NO. | MANUFACTURE | MODEL |
|---|---|---|
| 1 | RCOO | Printer MP201 |

<Determination on Possibility of Installation-Second Embodiment>

Figure 13:
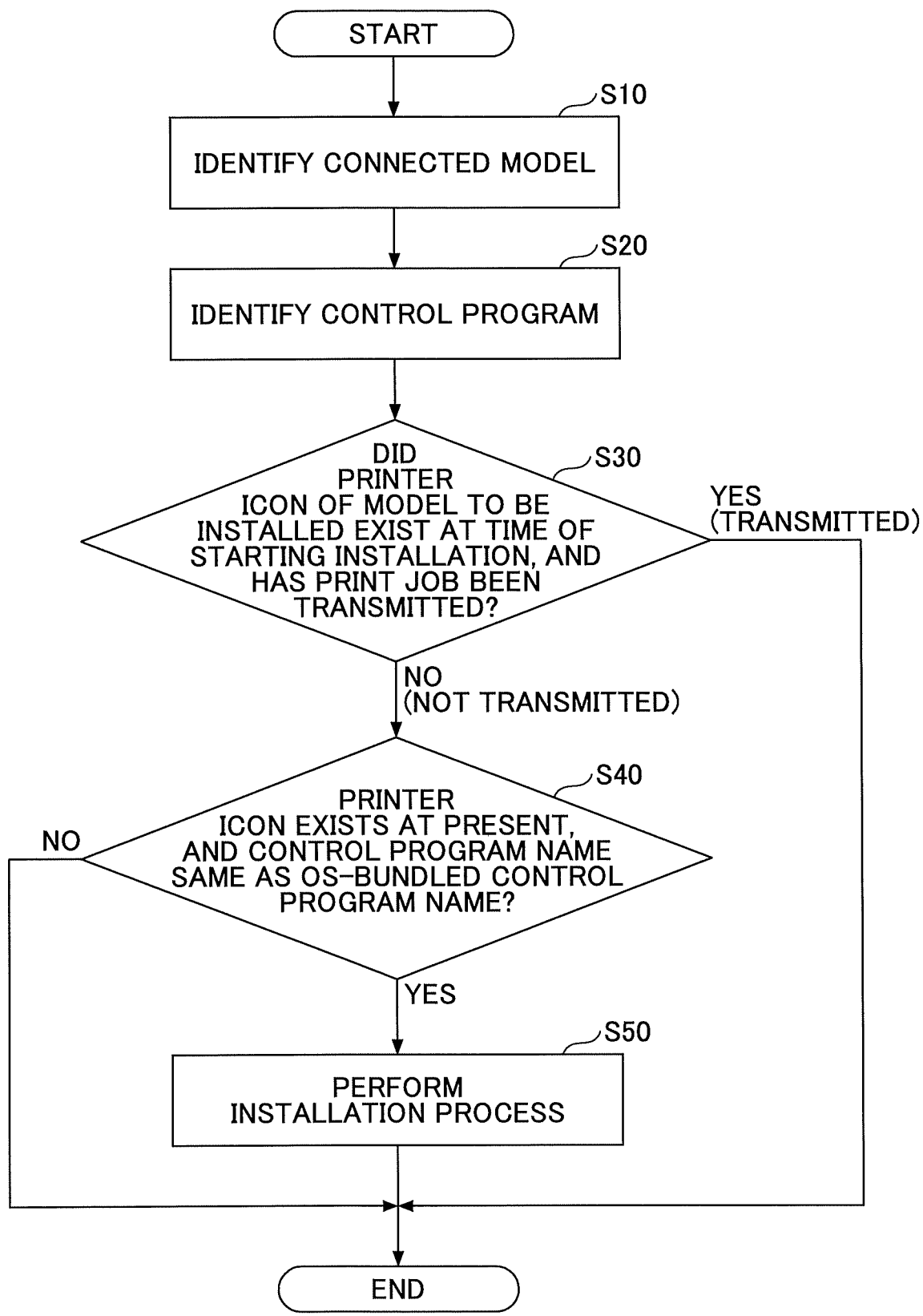
FIG. 13 is an example of a flowchart illustrating a procedure in which the installation determining unit determines whether a control program is to be installed according to the second embodiment of the present invention.

FIG. 13 is an example of a flowchart illustrating a procedure in which the installation determining unit 19 determines whether a control program is to be installed. In the description of FIG. 13, mainly the differences from FIG. 10 will be described. The processes of steps S10 and S20 may be the same as those of FIG. 10.

In step S30, before installing the control program corresponding to the model determined in step S20, the installation determining unit 19 acquires the printer icon name and the print job transmission count held by the printer icon use recording unit 25. Then, the installation determining unit 19 determines whether the printer icon 70 of the model to be installed, already existed at the time of installation of the installer 60, and has transmitted a print job (step S30). As described above, since the model name of the printer A 30 can be known, the print job transmission count associated with the printer icon name or the control program name including the model name, is acquired. That is, the installation determining unit 19 determines whether the control program of the printer icon 70 identified by the model name, has been used.

When the print job transmission count is one or more (greater than or equal to a threshold value), the user is using the control program, and therefore the installation determining unit 19 does not replace the control program.

Even when the print job transmission count is zero, in order to cause the installer 60 to recognize the MANUFACTURE name and the MODEL name, the user may connect the printer A 30 and the information processing apparatus 10, and plug & play may be performed, and the printer icon 70 may be created. Therefore, the processes from step 40 and onward in FIG. 10 are executed. The subsequent processes may be the same as those in FIG. 10.

Therefore, according to the present embodiment, it is determined whether the control program is being used based on the print job transmission count held by the printer icon 70, and it can be determined whether to install the control program of the new printer according to the determination result of whether the control program is being used.

Third Embodiment

In the present embodiment, installation of a control program when a plurality of printers A and C are connected, will be described. Each of the printers A and C is the printer 30 connected by a USB cable.

Figure 14:
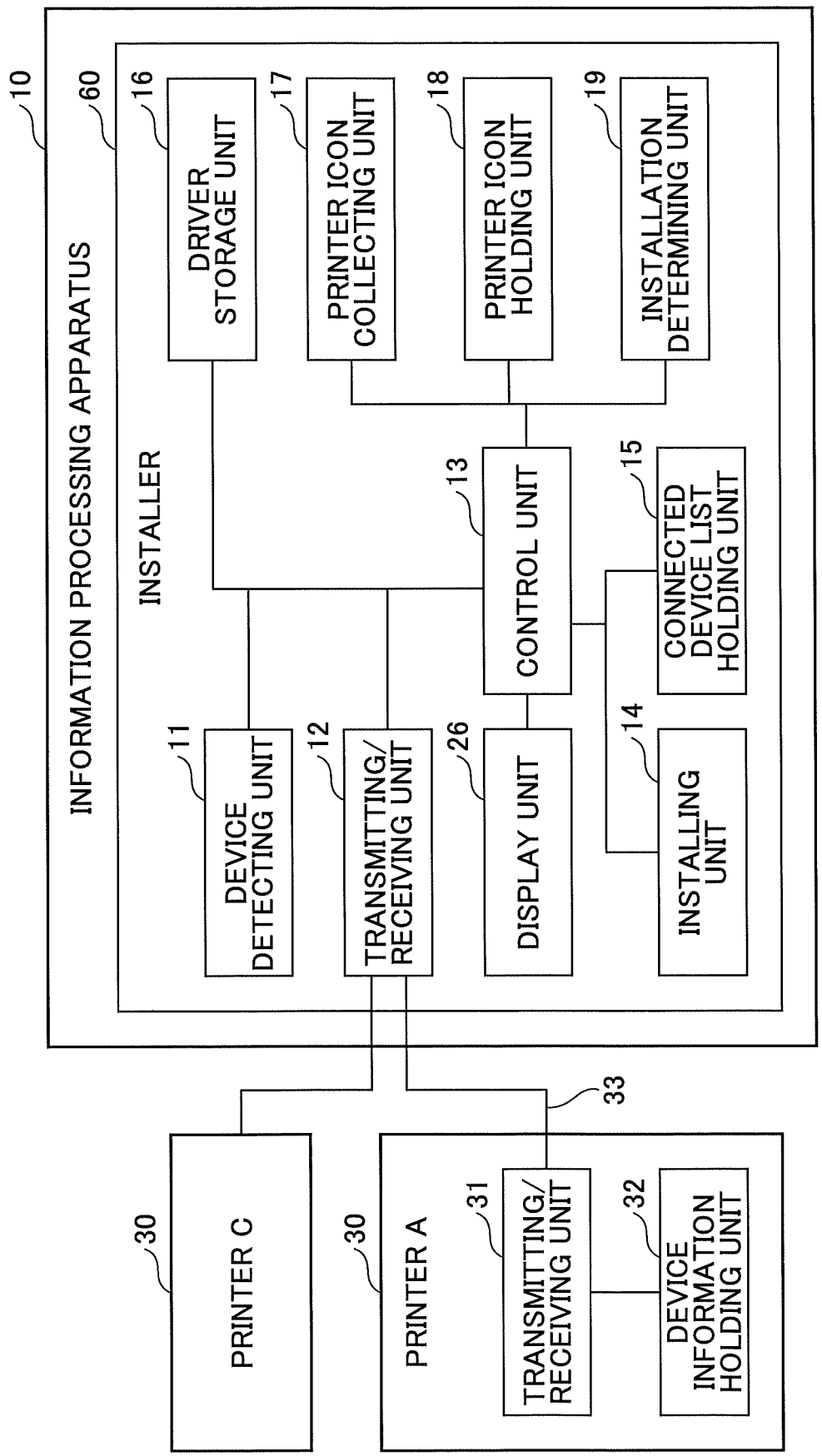
FIG. 14 is an example of a functional block diagram of the printer and the information processing apparatus included in the information processing system according to a third embodiment of the present invention.

FIG. 14 is an example of a functional block diagram of the printer A 30 and the information processing apparatus 10 included in the information processing system 100. In the description of FIG. 14, the constituent elements denoted by the same reference numerals as those in FIG. 6A perform the same functions, so only the main constituent elements of the present embodiment may be described.

The installer 60 of the present embodiment includes the display unit 26. The display unit 26 is implemented as the CPU 301 illustrated in FIG. 5 executes the OS and the installer 60, and controls the display I/F 306, etc. The display unit 26 displays various screens to be an interface with the user.

Also in FIG. 14, the control program may be stored in the server 50 as illustrated in FIG. 6B.

<Operation Procedure—Third Embodiment>

Figure 15:
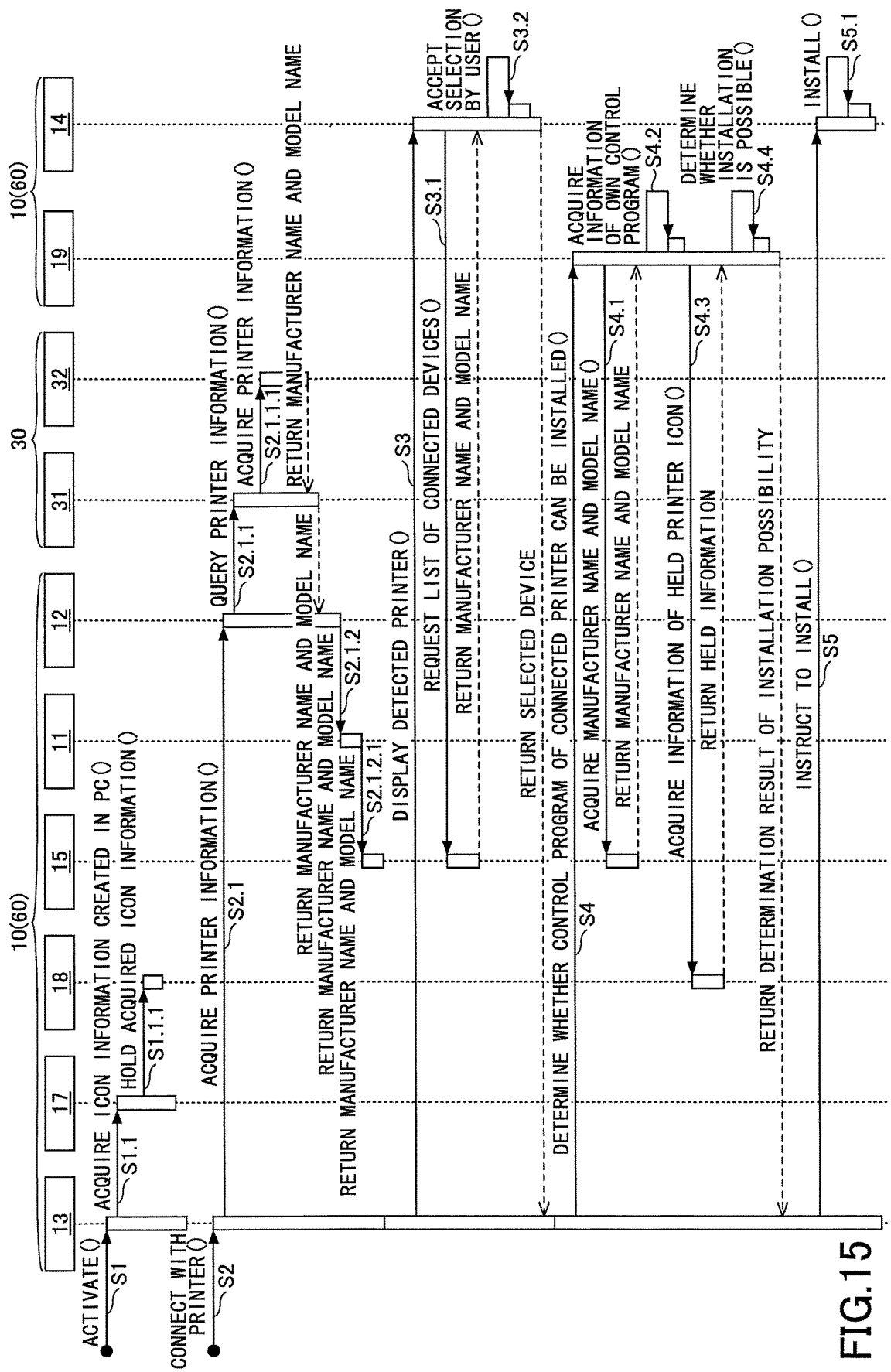
FIG. 15 is an example of a sequence diagram illustrating a procedure in which the information processing apparatus installs the control program according to the third embodiment of the present invention.

FIG. 15 is an example of a sequence diagram illustrating a procedure in which the information processing apparatus 10 installs the control program. In the description of FIG. 15, differences from FIG. 9 will mainly be described. The descriptions of steps S1 to S2.1.2.1 and S4 to S5.1 in FIG. 15 are the same as those in FIG. 9. However, since a plurality of printers A and C are connected to the information processing apparatus 10, it is possible to acquire a plurality of pieces of printer information.

Figure 16:
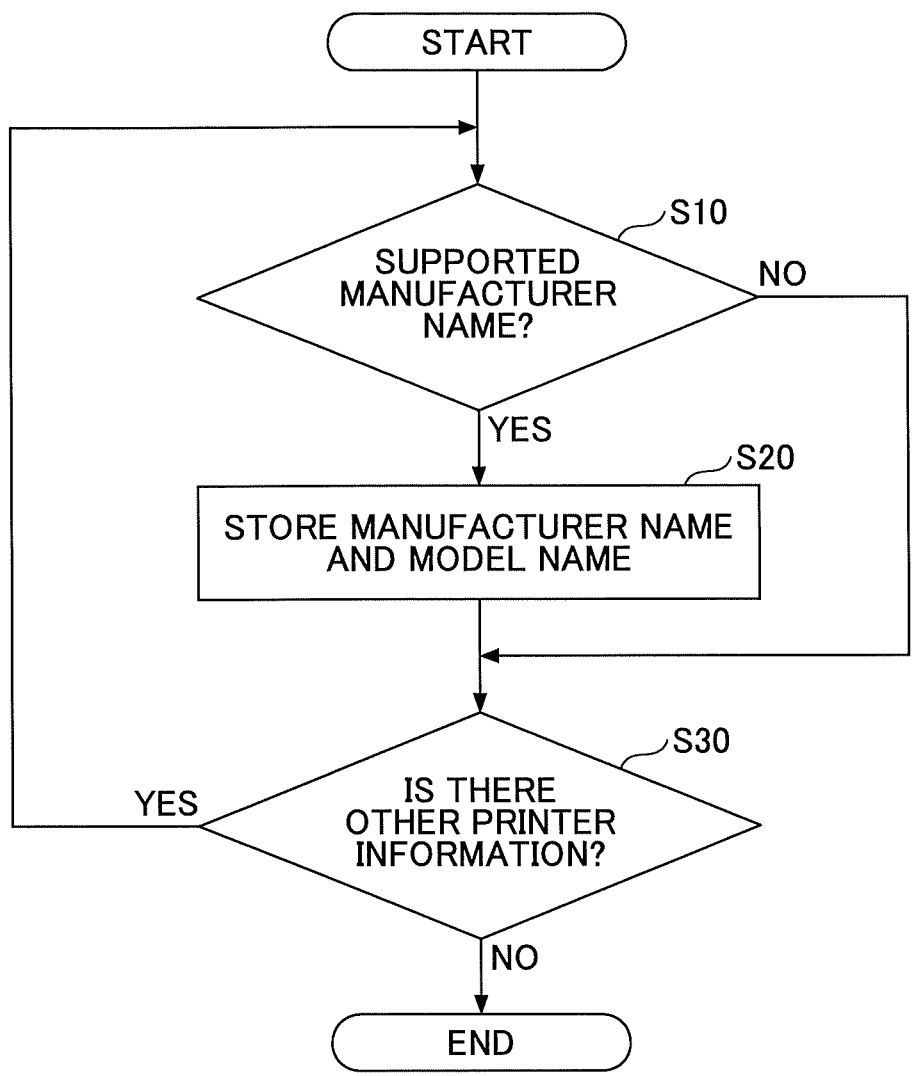
FIG. 16 is an example of a flowchart illustrating a procedure in which a device detecting unit stores a plurality of MANUFACTURE names and MODEL names according to the third embodiment of the present invention.

Therefore, in steps S1 to S2.1.2.1., as illustrated in FIG. 16, the device detecting unit 11 stores all of the acquired MANUFACTURE names and MODEL names in the connected device list holding unit 15. Also in this case, the device detecting unit 11 may determine whether the MANUFACTURE name matches the manufacturer name, etc., of the installer 60, and may store the MANUFACTURE name and the MODEL name only when the names match.

FIG. 16 is an example of a flowchart illustrating a procedure in which the device detecting unit 11 stores a plurality of MANUFACTURE names and MODEL names.

The device detecting unit 11 determines whether the MANUFACTURE name matches the manufacturer name, etc., of the installer 60 (step S10).

When the names match, all of the acquired MANUFACTURE names and MODEL names are stored in the connected device list holding unit 15 (step S20).

The device detecting unit 11 determines whether any other printer information has been acquired (step S30), and repeats the process of step S10 when there is other information.

TABLE 6

| NO. | MANUFACTURE | MODEL |
|---|---|---|
| 1 | OEM | Printer MP201 |
| 2 | OEM | Printer MP301 |

Table 6 indicates the printer information held in the connected device list holding unit 15. Table 6 indicates that two pieces of printer information have been acquired.

Referring back to FIG. 15, the description is continued.

Step S3: The control unit 13 requests the display unit 26 to display the printer information.

Step S3.1: The display unit 26 requests a list of connected printers, to the connected device list holding unit 15.

Step S3.2: The display unit 26 displays, on the display 310, the list of printers acquired from the connected device list holding unit 15. The user selects the printer 30 to be installed, and therefore the display unit 26 accepts the selection.

Since the printer 30 selected by the user is notified to the control unit 13, the control unit 13 installs the control program of the printer 30 after step S4.

<Screen Example—Third Embodiment>

Figure 17:
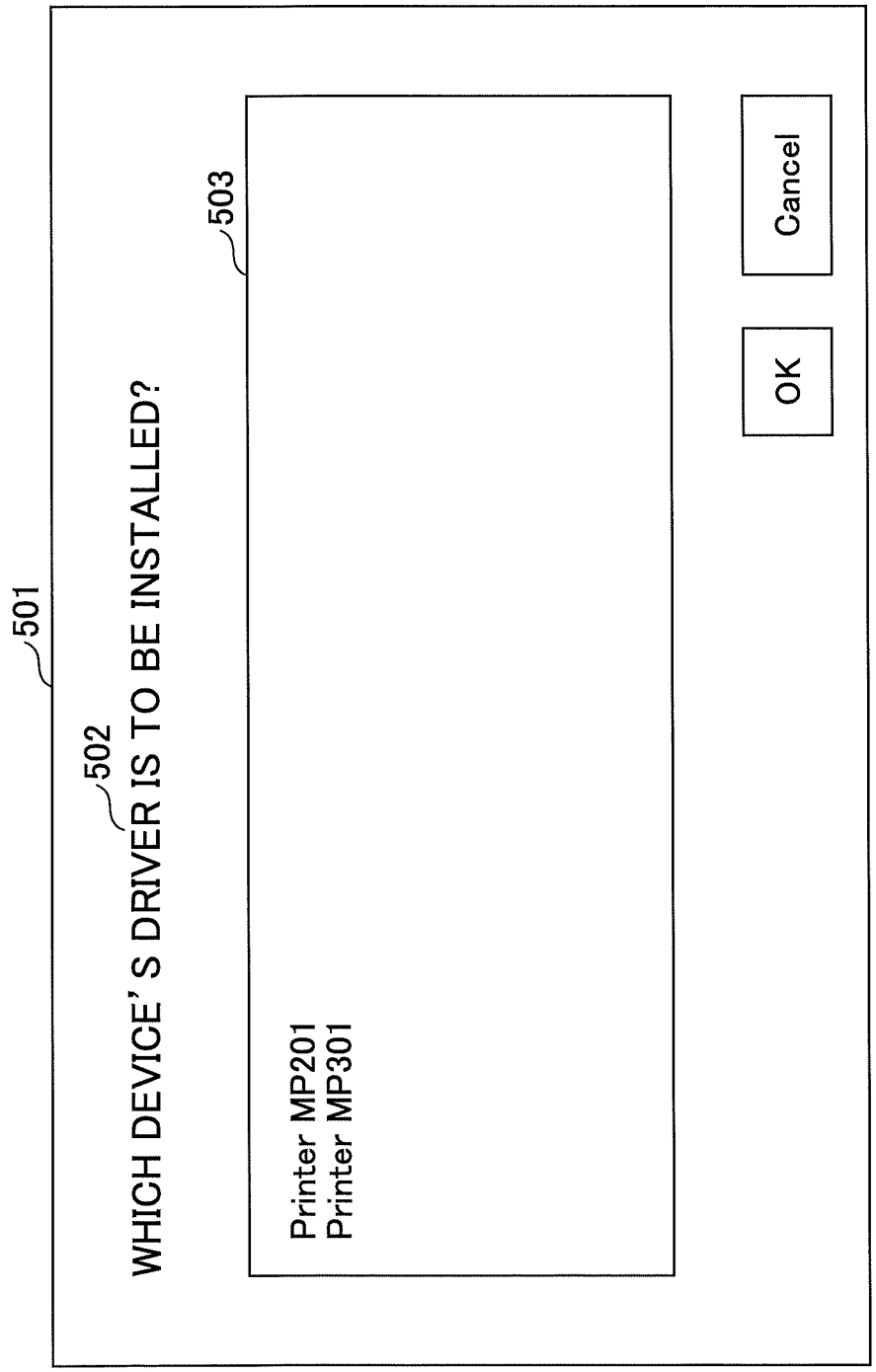
FIG. 17 is a diagram illustrating an example of a selection screen displayed on a display according to the third embodiment of the present invention.

FIG. 17 is a diagram illustrating an example of a selection screen 501 displayed on the display 310. The selection screen 501 includes a message 502 reading "which device's driver is to be installed?", and a model name field 503. The user selects the model name for which the control program to be installed, from the model name field 503.

Furthermore, when a plurality of printers of the same model are connected, the display unit 26 can detect and display each of the printers. However, due to the plug & play specification of Windows, the same hardware ID is specified for the same model at the time of installation, and therefore the same control program is installed in the two printer icons 70. Therefore, even if the display unit 26 displays a plurality of the same model names, there is no meaning for the user to make a selection, and therefore when there are a plurality of the same model names, the display unit 26 displays only one model name.

Furthermore, in the process of FIG. 15, it is difficult to display the model name of the connected printer A 30 in a real-time manner; however, if the control unit 13 uses doReceiveMSWindowProcEvent( ), it is possible to receive the connection event of the printer A 30. When the processes of steps S3 to S3.2 in FIG. 15 are performed when the control unit 13 receives an event, it is possible to display the model name of the connected printer A on the screen, in a real-time manner. doReceiveMSWindowProcEvent( ) is an API for detecting the increase/decrease of electronic devices connected by a USB cable.

<Installation Result Report Screen—Third Embodiment>

Furthermore, the display unit 26 can display a report screen to the user.

Figure 18:
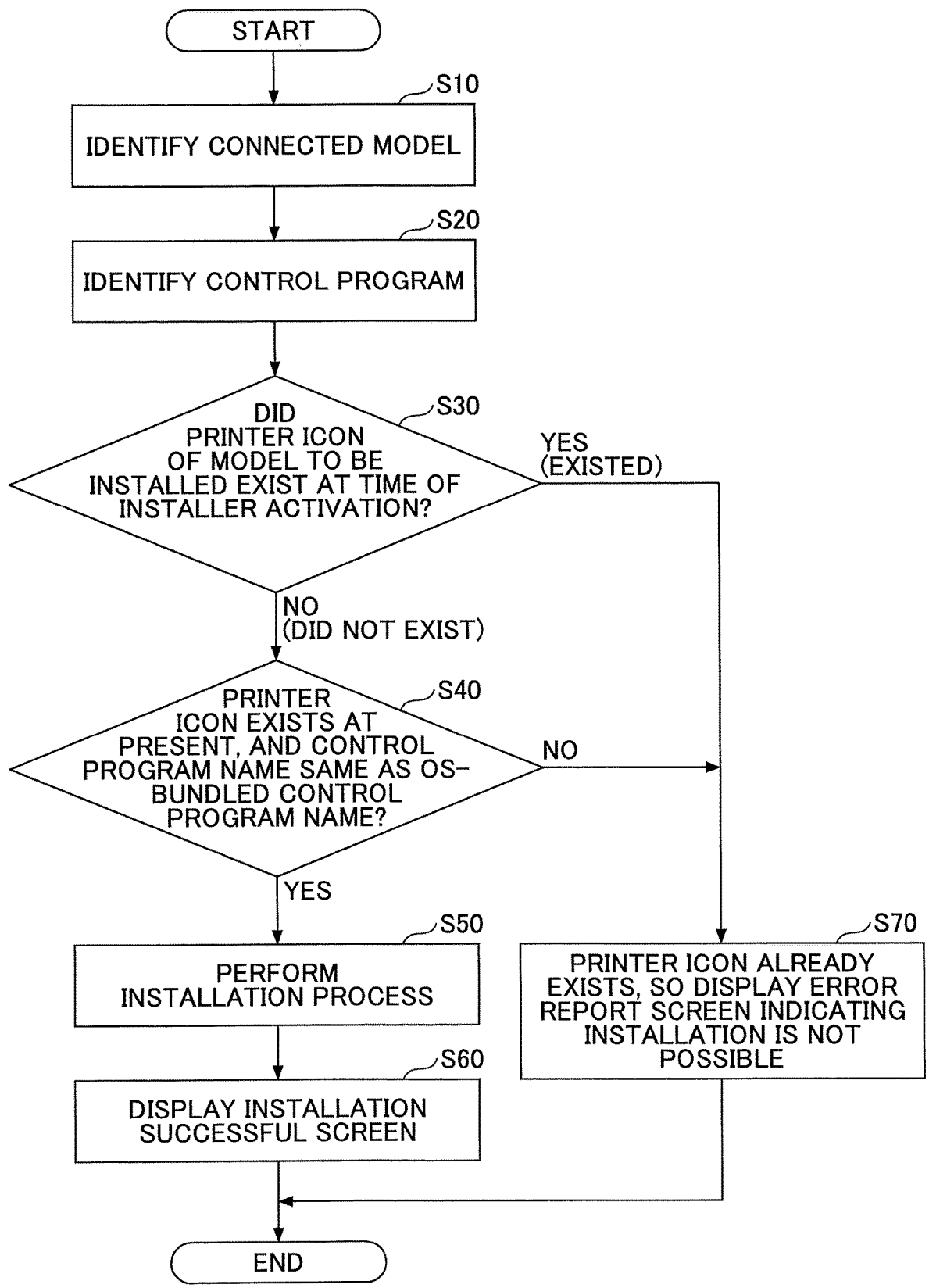
FIG. 18 is an example of a flowchart illustrating a procedure in which the installation determining unit determines whether to install the control program and displays the installation result according to the third embodiment of the present invention.

FIG. 18 is an example of a flowchart illustrating a procedure in which the installation determining unit 19 determines whether to install the control program and displays the installation result. In the description of FIG. 18, mainly the differences from FIG. 10 will be described. Steps S10 to S50 may be the same as those of FIG. 10.

When the installation is successful in step S50, the display unit 26 displays an installation successful screen on the display 310 (step S60). An installation successful screen 311 is illustrated in FIG. 19A.

When the installation determining unit 19 determines as YES in step S30 (when a printer icon name of the control program to be installed already exists), the display unit 26 displays an error report screen 321 (step S70). An error report screen 321 is illustrated in FIG. 19B.

On the installation successful screen 311 of FIG. 19A, a message 312 reading "device of printer MP201 has been added" is displayed. The user can recognize the added control program. On the error report screen 321 of FIG. 19B, a message 322 reading "device of printer MP201 is already installed" is displayed. The user can recognize that the control program has not been installed and there was no need to install the control program.

According to the present embodiment, even when a plurality of printers A and C are connected by the USB cable, it is possible to determine the control program to be installed by displaying the model name. The user can recognize whether the control program has been installed.

Note that the present embodiment can be combined with either the first embodiment or the second embodiment.

Fourth Embodiment

In the first and second embodiments, when the user changes the printer icon name, it becomes difficult for the installation determining unit 19 to determine whether the printer icon 70 corresponding to the model for which the control program is to be installed, exists at the time of installation. This is because even if the printer icon name changes, the printer icon names in Table 2 of the first embodiment and Table 4 of the second embodiment collected by the printer icon collecting unit 17, do not change.

Therefore, in the present embodiment, the information processing apparatus 10 in which the control unit 13 applies the change in the printer icon name, to the printer icon name in the printer icon holding unit 18 or the printer icon use recording unit 25, will be described.

<Change of Printer Icon Name—Fourth Embodiment>

FIG. 20 is an example of a flowchart illustrating a procedure in which the control unit 13 detects the change of the printer icon name. The process of FIG. 20 is executed during the activation of the installer 60.

The control unit 13 acquires all of the printer icon names installed in the information processing apparatus 10 with EnumPrinters( ) (step S10).

Next, the printer icon names of step S10 are used to invoke OpenPrinter( ) for all of the printer icons (step S20). The handles of the printer icons can be acquired with OpenPrinter( ).

Next, the control unit 13 uses the handles to invoke FindFirstPrinterChangeNotification( ) (step S30). At this time, PRINTER_CHANGE_ALL is set as the second argument.

Next, the control unit 13 uses WaitForSingleObject (Windows API that returns control when the specified object becomes a signal state) to invoke FindNextPrinterChangeNotification( ), and follows PRINTER_NOTIFY_FIELD_PRINTER_NAME included in PRINTER_NOTIFY_INFO_DATA of the structure returned as the fourth argument, to acquire a printer icon name (step S40).

Next, when there is a change compared to the printer icon name in the printer icon holding unit 18 or the printer icon use recording unit 25, the printer icon name is updated by the printer icon name that has become the signal state at step S40 (step S50).

Accordingly, even if the user changes the printer icon name, the printer icon names in Tables 2 and 4 can be updated, and therefore the installation determining unit 19 can appropriately determine whether to install a new control program.

<Increase/Decrease of Printer Icon—Fourth Embodiment>

When the control program is newly installed, the number of printer icons 70 increases, and if the user deletes the printer icon 70, the number of printer icons 70 held by the information processing apparatus 10 decreases. If this increase or decrease is not applied to Tables 2 and 4, it is difficult for the installation determining unit 19 to determine whether the printer icon 70 corresponding to the model for which a control program is to be installed, exists at the time of installation.

Therefore, the control unit 13 applies the increase and decrease of the printer icon 70 to Tables 2 and 4 as follows.

Figure 21:
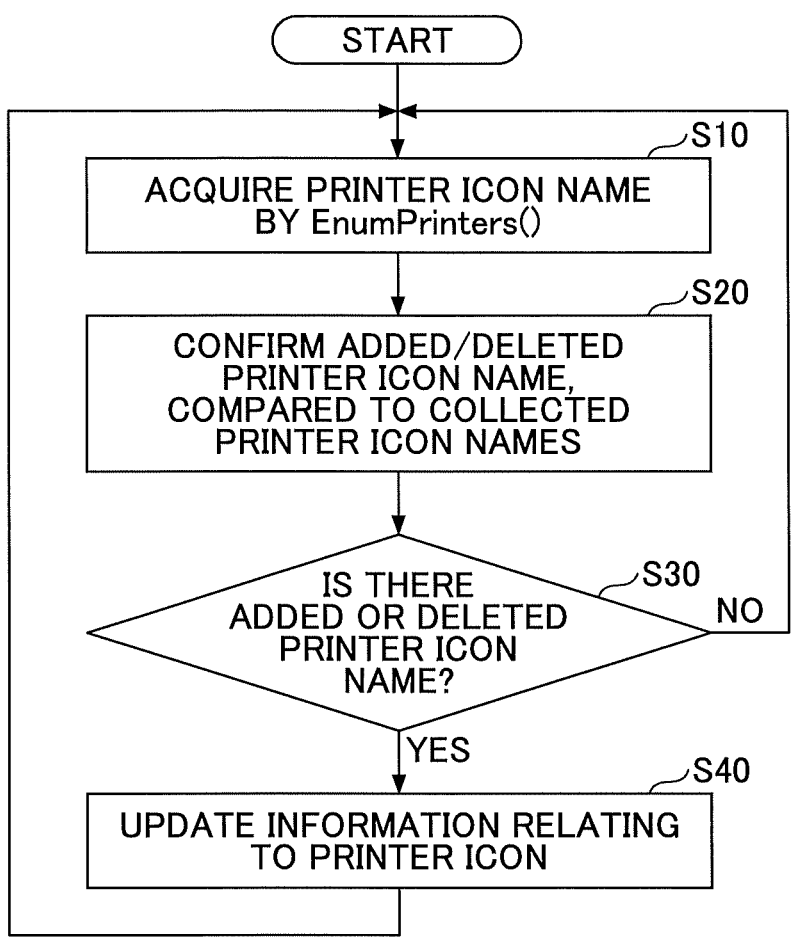
FIG. 21 is an example of a flowchart illustrating a procedure for detecting an increase/decrease of the printer icon when resident software is constantly monitoring print jobs according to the fourth embodiment of the present invention.

FIG. 21 is an example of a flowchart illustrating a procedure for detecting an increase/decrease of the printer icon 70 when the resident software is constantly monitoring the print jobs. The process in FIG. 21 is executed during the activation of the installer 60.

First, the control unit 13 acquires the printer icon names with EnumPrinters( )(step S10).

Next, the control unit 13 compares the printer icon names in Table 2 or Table 4 with the printer icon names acquired by EnumPrinters( ), and confirms whether there is any increase or decrease (step S20).

When there is information relating to the printer icon 70 that has been added (YES in step S30), the control unit 13 acquires the printer icon name, the driver name, and the port name from PRINTER_INFO_2, and updates Table 2 or Table 4 (step S40). For example, the control unit 13 deletes the record of the corresponding printer icon name from Table 2 or Table 4.

In this way, even if the printer icon 70 increases or decreases, the information on the printer icons in Tables 2 and 4 can be updated, and therefore the installation determining unit 19 can appropriately determine whether to install a new control program.

Note that the present embodiment can be applied in combination with any of the first to third embodiments.

OTHER APPLICATION EXAMPLES

Although the best modes for carrying out the present invention have been described above by way of the embodiments, the present invention is not limited to these embodiments, and various modifications and substitutions may be made without departing from the spirit of the present invention.

For example, in the present embodiment, plug & play that occurs when an electronic device is connected by a USB cable has been described; however, the present embodiment is also applicable to plug & play that occurs when an electronic device is connected via a network. Furthermore, the mechanism of automatically installing the control program need not be referred to as plug & play. For example, JINI is a mechanism similar to universal plug & play.

Furthermore, the configuration examples of FIGS. 6, 11, and 14 indicated in the above embodiments are divided according to the main functions to facilitate the understanding of processes by the information processing apparatus 10 and the printer 30. The present invention is not limited by how the process units are divided or the names of the process units. The processes of the information processing apparatus 10 and the printer 30 may be further divided into many process units according to the process contents. Furthermore, the process units may be divided such that a single process unit further includes many processes.

Note that the printer icon collecting unit 17 is an example of an information collector, the device detecting unit 11 is an example of a device information acquirer, the installation determining unit 19 is an example of a determiner, the installing unit 14 is an example of an installer, the display unit 26 is an example of a displayer, and the control unit 13 is an example of an updater.

According to one embodiment of the present invention, an information processing apparatus that reduces inconveniences caused by installation of a control program, can be provided.

The information processing apparatus, the installation method, and the recording medium are not limited to the specific embodiments described in the detailed description, and variations and modifications may be made without departing from the spirit and scope of the present invention.

What is claimed is:

1. An information processing apparatus in which a program corresponding to an electronic device is installed in response to the electronic device being connected to the information processing apparatus, the information processing apparatus comprising a processor, in communication with a memory, executing a process including:
    collecting information including an icon name that corresponds to a first program and relating to the first program already installed in the information processing apparatus;
    acquiring identification information of the electronic device from the electronic device connected to the information processing apparatus; and
    determining whether to install a second program identified by the identification information, by determining, whether an icon name relating to the second program matches an icon name relating to the first program and whether a name of the first program matches a name of a control program that is bundled with an operating system (OS) of the information processing apparatus,
    wherein the second program is a newest and different version than a version of the first program, and the second program is included in a storage medium or a device connected to the information processing apparatus,
    wherein the determining includes counting a number of use of the first program and storing the number of use of the first program, and determining not to install the second program, upon determining that the number of use of the first program is equal or more than a predetermined number while it is determined that the icon name relating to the second program matches the icon name relating to the first program.

2. The information processing apparatus according to claim 1, wherein the determining includes determining not to install second program, upon determining that the information is identified by the identification information.

3. The information processing apparatus according to claim 2, wherein
    the information includes a display name or a program name relating to the electronic device corresponding to the first program,
    the identification information includes model information of the electronic device, and
    the determining includes determining that the information is identified by the identification information, upon determining that the model information is included in the display name or the program name.

4. The information processing apparatus according to claim 2, wherein
    the determining includes:
        collecting, after the electronic device is connected to the information processing apparatus, the information installed in the information processing apparatus, upon determining that the information, which has already been collected before the electronic device is connected to the information processing apparatus, cannot be identified by the identification information, and
        determining to install the second program, upon determining that the information, which has been collected after the electronic device is connected to the information processing apparatus, is identified by the identification information.

5. The information processing apparatus according to claim 2,
    the determining includes:
        collecting, after the electronic device is connected to the information processing apparatus, a program name as the information installed in the information processing apparatus, upon determining that the information, which has already been collected before the electronic device is connected to the information processing apparatus, cannot be identified by the identification information; and
        determining to install the second program, upon determining that the information, which has been collected after the electronic device is connected to the information processing apparatus, is identified by the identification information, and upon determining that a program name of the second program is the same as the program name of the first program.

6. The information processing apparatus according to claim 2, wherein the identification information includes a model name of PnP ID of the electronic device.

7. The information processing apparatus according to claim 1, wherein
the information includes a usage count of the first program, and
the determining includes determining not to install the second program upon determining that the usage count of the first program is greater than or equal to a threshold.

8. The information processing apparatus according to claim 1, wherein
the determining includes:
collecting, after the electronic device is connected to the information processing apparatus, the information already installed in the information processing apparatus upon detecting that the first program has not been used before, and
determining to install the second program upon determining that the information, which has been collected after the electronic device is connected to the information processing apparatus, is identified by the identification information.

9. The information processing apparatus according, to claim 1, wherein
the determining includes:
collecting, after the electronic device is connected to the information processing apparatus, a program name as the information already installed in the information processing apparatus, upon detecting that the first program has not been used before, and
determining to install the second program upon determining that the information, which has been collected after the electronic device is connected to the information processing apparatus, is identified by the identification information, and upon determining that a program name of the second program is the same as the program name of the first program.

10. The information processing apparatus according to claim 1, wherein the processor further executes the process including:
installing the second program upon determining to install the second program, wherein
the installing includes displaying, on a display device, a message indicating whether the second program has been installed.

11. The information processing apparatus according to claim 1, wherein the processor further executes the process including:
updating the collected information already installed in the information processing apparatus, upon detecting a change in the information.

12. The information processing apparatus according to claim 11, the updating includes updating the collected information, upon detecting a change in a display name of the electronic device corresponding to the first program among the information, or upon detecting an increase or a decrease in quantity of the installed first programs.

13. The information processing apparatus according to claim 1, wherein the electronic device is connected to the information processing apparatus by a universal serial bus (USB) cable.

14. The information processing apparatus according to claim 1, wherein the number of use of the first program is zero when an icon that corresponds to the first program is initially created, and increases as the information processing apparatus sends a print job to the electric device by using the first program.

15. The information processing apparatus according to claim 1, wherein the determining includes determining that the second program is not to be installed upon determining that the icon name relating to the second program does not match the icon name relating to the first program or that the name of the first program does not match the name of the control program bundled with the operating system (OS) of the information processing apparatus.

16. The information processing apparatus according to claim 1, wherein the determining includes determining to install the second program upon determining that the number of use of the first program is less than a predetermined number.

17. A non-transitory computer-readable recording medium storing a program that causes a computer to execute a process performed in an information processing apparatus in which a program corresponding to an electronic device is installed in response to the electronic device being connected to the information processing apparatus, the process comprising:
collecting information including an icon name that corresponds to a first program and relating to the first program already installed in the information processing apparatus;
acquiring identification information of the electronic device from the electronic device connected to the information processing apparatus; and
determining whether to install a second program identified by the identification information, by determining whether an icon name relating to the second program matches an icon name relating to the first program and whether a name of the first program matches a name of a control program that is bundled with an operating system (OS) of the information processing apparatus,
wherein the second program is a newest and different version than a version of the first program, and the second program is included in a storage medium or a device connected to the information processing apparatus,
wherein the determining includes counting a number of use of the first program and storing the number of use of the first program, and determining not to install the second program which is newer than the first program, upon determining that the number of use of the first program is equal or more than a predetermined number while it is determined that the icon name relating to the second program matches the icon name relating to the first program.

18. An installation method, executed by a computer, in an information processing apparatus in which a program corresponding to an electronic device is installed in response to the electronic device being connected to the information processing apparatus, the installation method comprising:
collecting information including an icon name that corresponds to a first program and relating to the first program already installed in the information processing apparatus;
acquiring identification information of the electronic device from the electronic device connected to the information processing apparatus; and
determining whether to install a second program identified by the identification information, by determining whether an icon name relating to the second program matches an icon name relating to the first program and whether a name of the first program matches a name of a control program that is bundled with an operating system (OS) of the information processing apparatus, wherein the second program is a newest and different version than a version of the first program, and the second program is included in a storage medium or a device connected to the information processing apparatus, wherein the determining includes counting a number of use of the first program and storing the number of use of the first program, and determining not to install the second program which is newer than the first program, upon determining that the number of use of the first program is equal or more than a predetermined number while it is determined that the icon name relating to the second program matches the icon name relating to the first program.

\* \* \* \* \*